(12) United States Patent
McCallum

(10) Patent No.: US 9,574,862 B2
(45) Date of Patent: Feb. 21, 2017

(54) ERGONOMIC MULTIFUNCTIONAL TAPE MEASURE

(71) Applicant: Gary McCallum, Kelowna (CA)

(72) Inventor: Gary McCallum, Kelowna (CA)

( * ) Notice: Subject to any disclaimer, the term of this patent is extended or adjusted under 35 U.S.C. 154(b) by 95 days.

(21) Appl. No.: 14/739,842

(22) Filed: Jun. 15, 2015

(65) Prior Publication Data

US 2015/0362304 A1   Dec. 17, 2015

Related U.S. Application Data

(60) Provisional application No. 62/012,110, filed on Jun. 13, 2014.

(51) Int. Cl.
*G01B 3/10* (2006.01)

(52) U.S. Cl.
CPC ........... *G01B 3/1005* (2013.01); *G01B 3/1056* (2013.01); *G01B 2003/1015* (2013.01); *G01B 2003/1046* (2013.01)

(58) Field of Classification Search
CPC ................ G01B 3/1005; G01B 3/1056; G01B 2003/1015; G01B 2003/1046
USPC .......................................................... 33/767
See application file for complete search history.

(56) References Cited

U.S. PATENT DOCUMENTS

| | | | |
|---|---|---|---|
| 4,288,923 A * | 9/1981 | Duda | G01B 3/1005 33/767 |
| 4,856,726 A | 8/1989 | Kang | |
| 4,890,393 A | 1/1990 | St. Jean | |
| 4,908,954 A | 3/1990 | Johnson | |
| 4,927,092 A * | 5/1990 | Ingram, II | G01B 3/1005 242/381.3 |
| 5,001,843 A | 3/1991 | Chapin | |
| 5,007,178 A * | 4/1991 | Dewire | G01B 3/1005 33/754 |
| 5,007,187 A | 4/1991 | Lloyd | |
| 5,134,784 A | 8/1992 | Atienza | |
| 5,172,486 A | 12/1992 | Waldherr | |
| 5,295,308 A | 3/1994 | Stevens | |
| 5,367,785 A * | 11/1994 | Benarroch | E05B 67/006 33/755 |
| 5,406,711 A | 4/1995 | Graham | |

(Continued)

FOREIGN PATENT DOCUMENTS

| EP | 0932016 | 7/1999 |
|---|---|---|
| EP | 0932639 | 1/2006 |

*Primary Examiner* — Yaritza Guadalupe-McCall
(74) *Attorney, Agent, or Firm* — Antony C. Edwards

(57) ABSTRACT

A multifunctional ergonomic tape measure provides a stopping mechanism within its housing body containing a retractable measuring tape which is engaged by squeezing together the housing body and a hinged arm, thereby clamping the measuring tape firmly between two friction surfaces provided by corresponding friction pads mounted in opposed facing relation on the housing body and the arm. The housing includes a duck-bill extending from the front of the body. The duck-bill has a flat, large surfaced face on the front thereof for reading measurements and for sliding along the edges of building material when making parallel lines. The tape end of the tape provides a thumb hold on its upper portion to aid the user in firmly holding both a pencil or utility knife and the tape end. The tape measure is useful for drawing a radius, to obtain inside measurements, and as a square to mark short length right angle lines.

16 Claims, 22 Drawing Sheets

(56) References Cited

U.S. PATENT DOCUMENTS

| | | | |
|---|---|---|---|
| 5,657,551 A | 8/1997 | Lin et al. | |
| 5,735,052 A | 4/1998 | Lin | |
| 5,782,007 A | 7/1998 | Harris | |
| 5,842,284 A | 12/1998 | Goldman | |
| 6,041,513 A | 3/2000 | Doak | |
| 6,070,338 A | 6/2000 | Garity | |
| 6,405,451 B1 | 6/2002 | Hsu | |
| 6,581,432 B1 | 6/2003 | Rut | |
| 6,643,948 B1 * | 11/2003 | Seymour | G01B 3/1005 33/767 |
| 6,691,425 B1 | 2/2004 | Lee et al. | |
| 6,736,603 B2 | 5/2004 | Chang | |
| 6,910,280 B2 | 6/2005 | Scarborough | |
| 6,912,799 B1 | 7/2005 | Smith | |
| 6,935,045 B2 | 8/2005 | Cubbedge | |
| 7,024,790 B1 | 4/2006 | Qilian | |
| 7,131,215 B2 | 11/2006 | Kang | |
| 7,234,246 B1 | 6/2007 | Rhead | |
| 7,263,784 B1 * | 9/2007 | Lee | G01B 3/1005 242/381.3 |
| 7,266,854 B1 | 9/2007 | Gomez | |
| 7,548,536 B1 | 6/2009 | Alexander et al. | |
| 7,845,093 B2 | 12/2010 | Smiroldo | |
| 8,020,306 B2 | 9/2011 | Grivas et al. | |
| 8,020,312 B1 | 9/2011 | McGahan | |
| 8,429,830 B2 | 4/2013 | Kang | |
| 8,776,389 B2 | 7/2014 | Richard | |
| 8,806,770 B2 | 8/2014 | Steele et al. | |
| 8,898,922 B2 | 12/2014 | Bridges et al. | |
| 2003/0019116 A1 | 1/2003 | DeWall | |
| 2005/0034320 A1 | 2/2005 | Connor | |
| 2008/0034604 A1 * | 2/2008 | Critelli | G01B 3/1005 33/767 |
| 2012/0317828 A1 | 12/2012 | Richard | |
| 2013/0133215 A1 | 5/2013 | Bridges | |
| 2015/0362304 A1 * | 12/2015 | McCallum | G01B 3/1005 33/767 |

* cited by examiner

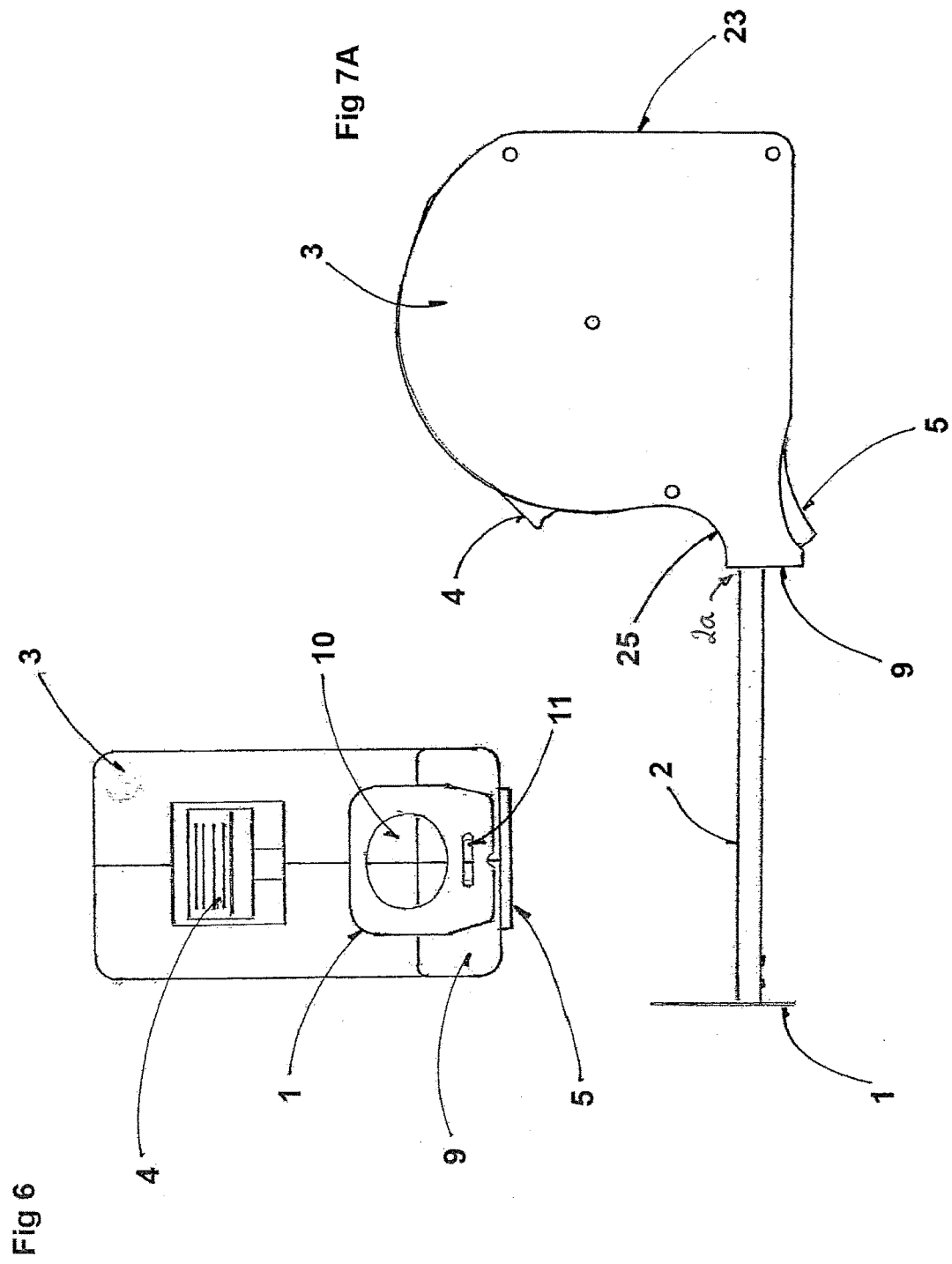

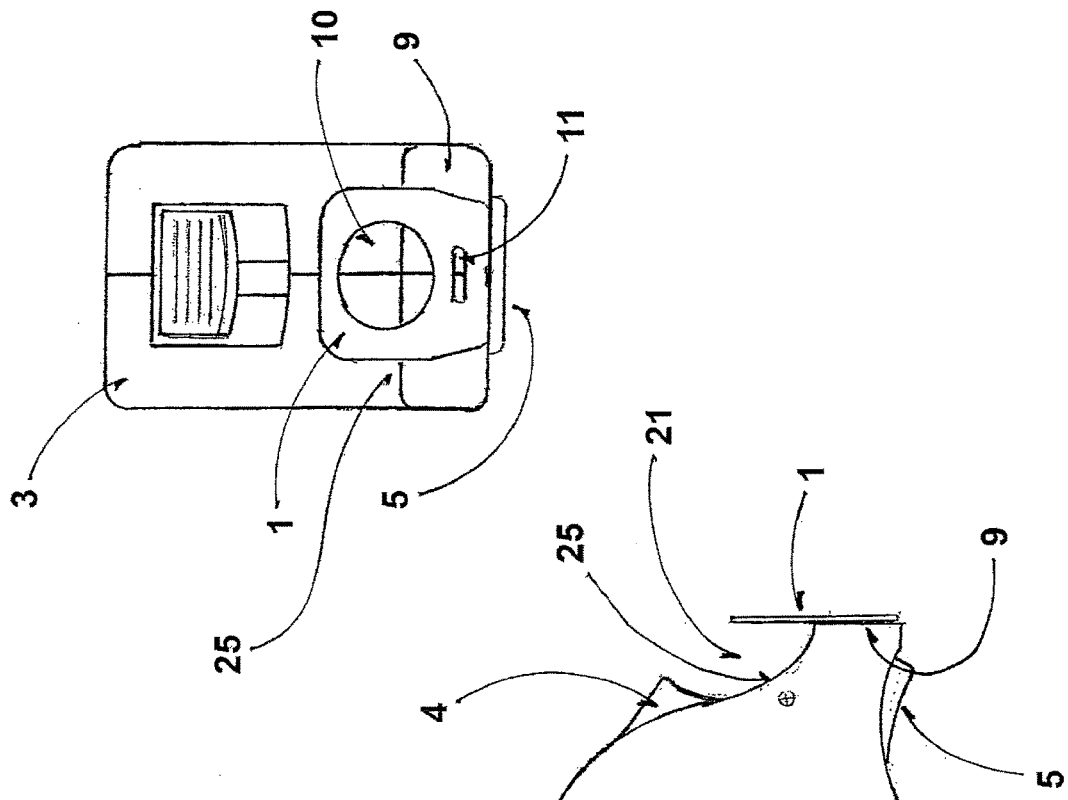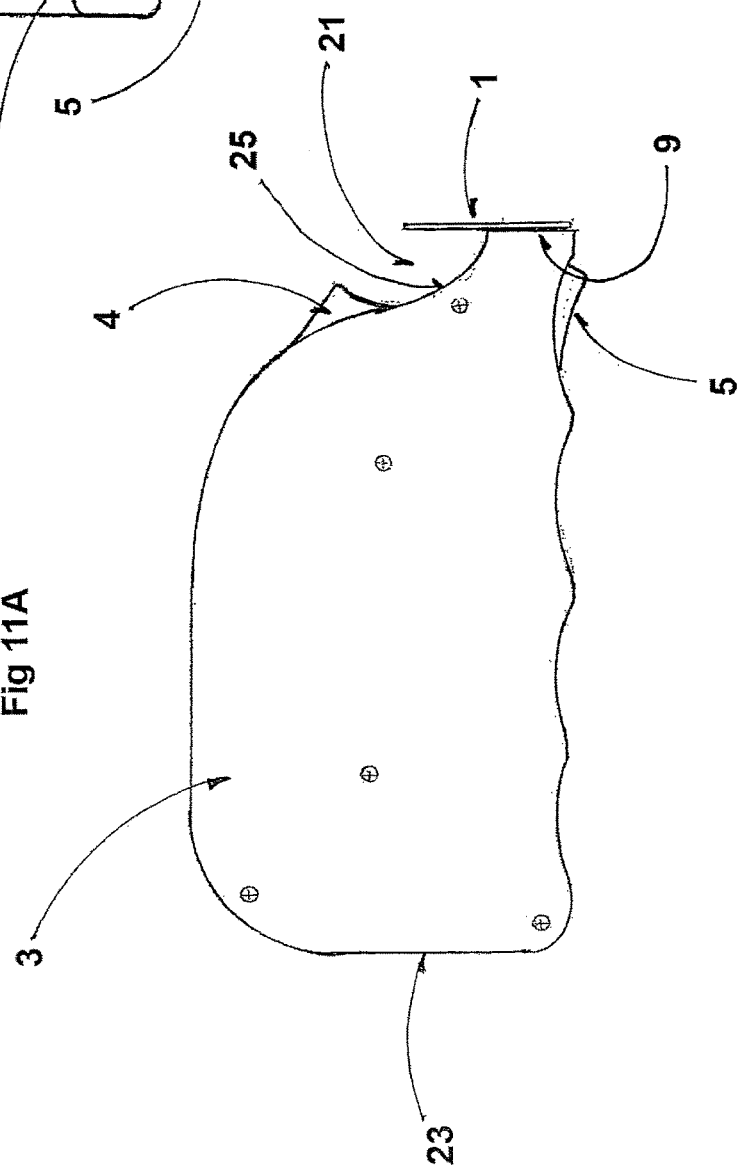

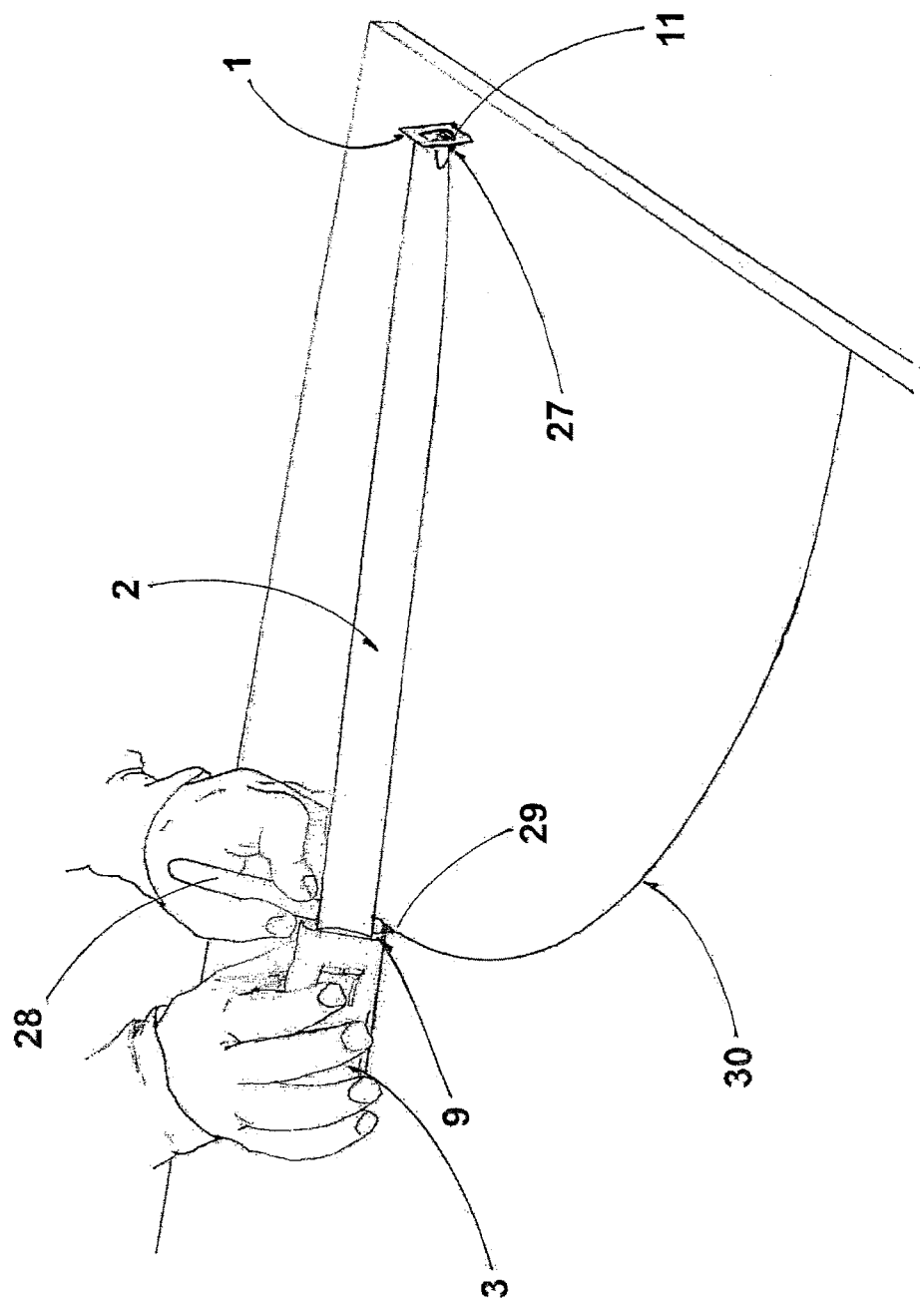

ERGONOMIC MULTIFUNCTIONAL TAPE MEASURE

BACKGROUND OF THE INVENTION

Of the many processes used in construction for measuring, scoring and marking parallel lines the number of means applied will depend on materials and circumstances. These tasks and other building methods can be made easier, simpler and quicker by modifying the tape measure to improve its ability to be used in other manners for different applications.

Carpenters needing to cut a piece of plywood to a consistent parallel width will often use a measuring tape with a chalk line to make a visual reference for guiding a saw. This process involves making measurements using a pencil to mark an indicator at either end of the sheet of plywood. The tape is set aside and a chalk line is then secured to the indicator mark on one end, unwound, aligned with the indicator mark at the other end and then snapped to produce a visible line after which the chalk line is rewound.

When professional wall boarders are scoring drywall to parallel widths or lengths they will often grasp the measuring tape along its length between their thumb and index finger at a desired measurement. The worker will then employ a utility knife that is pressed against the small metal end of the tape measure. By running the index finger along the straight edge of the drywall while holding the utility knife against the end of the tape measure a parallel scored line is produced. This is a task that takes a great deal of skill as one needs to pull the utility knife and finger holding the tape measure with their varying frictions in unison to produce a straight score line. They also have to be able to hold the utility knife and tape firmly using a small tape end not designed specifically to aid the purpose.

A negative aspect for professional wall boarders using the above method for cutting drywall is that the constant running of their index fingers along an abrasive paper or fibreglass surface often results in cuts or abrasions to the skin. In some cases permanent scaring or injury to the index finger can result after years of using this technique.

In comparison to drywall, for carpenters, the surface of the more abrasive edge on plywood makes using the measuring tape, index finger and pencil in combination for parallel marking more difficult and possibly dangerous. The resulting practice would likely lead to numerous cuts, abrasions and slivers during the course of a working day.

Tape measures are also used as a trammel for laying out circles. A small slot provided on the tape end is used to hook onto the top of a nail or screw at an established center point. With this tape measure design a pencil or other marking instrument can be held against the protruding face of the tape measure housing and the underside of the measuring tape when secured at an indicated measurement. The tape measure housing along with the marking devise can then be pulled towards the worker or pushed away from them to mark the partial or complete circumference of a circle.

There have been many previous attempts to devise a guide for enabling a tape measuring instrument to slide along a straight edge for marking or scoring. Some of these inventions such as Stevens et al. U.S. Pat. No. 5,295,308 and Harris U.S. Pat. No. 5,782,007 have been bulky additions to a tape measure that would inconvenience the user by being obtrusive or a feature constantly needing to be attached and then removed. Others such as Garity U.S. Pat. No. 6,070,338 and Lee et al. U.S. Pat. No. 6,691,425 do not provide a secure locking mechanism to work in a quick responsive ergonomic manner needed for the demands of professionals. Though Garity provides a smooth face it is not noted as being planar and perpendicular to the sides of tape measure housing and the extended tape. A planar smooth face with rounded edges allows the tape measure housing to slide smoothly while also securing the extended tape perpendicular to a straight edged working surface such as plywood, lumber or drywall. If the surface is smooth with any curvature it would make drawing or scoring parallel lines more difficult producing wavy score marks or lines unless the user has accumulated a great deal of skill Both Garity's and Lee et al.'s faces on their tape housing are not designed to ease the reading of measurements while simultaneously providing a functional grasping surface that works in conjunction with a finger controlled pressure locking mechanism.

The many locking mechanisms used for tape measures are not specifically designed to produce the firm, high friction holding capabilities combined with a quick release and ergonomics needed by drywall professionals to work in conjunction with the forces endured with constant, repetitious measuring and parallel marking. Both Hsu U.S. Pat. No. 6,405,451 B1 and Doriguzzi Bozzo, Mario European patent EP 0 932 016 A2 do not provide the significant forces that need to be applied. When the friction surfaces for grasping the tape measure are positioned as a fulcrum it will allow the mechanical advantage of leverage which is greatly increased when pressure is applied to the end of the trigger locks pressure pad distal to the stationary pivot point. A tape measure that combines an improved quick secure locking feature and easy to grasp tape end while also providing a guide that slides and offers a secure ergonomic means to hold the tape's body housing firmly against a materials edge surface will add significant advantages for making quick parallel linear measurements.

The tape ends used for hooking onto building material or stopping a tape that is pushed against material can also be better designed to facilitate the practice of holding onto the end with a scoring or marking instrument while at the same time helping to fulfill other functions. Garity's tape end, U.S. Pat. No. 6,070,338, is off set and angled from the lower portion of the tape end preventing use of the upper portion for pulling accurate measurements. The tape end for Lee et al. U.S. Pat. No. 6,691,425 B1 is also not capable of allowing the upper portion to be used for pulling measurements.

SUMMARY OF THE INVENTION

The presently disclosed tape measure makes the standard tape measure both multifunctional and more practical while retaining its basic design elements One application of the present invention is to make the common measuring and parallel scoring method used by drywall professionals and the methods employed by carpenters and other construction workers for making a parallel line quicker and simpler without many of the negative aspects that result from common conventional practices.

The invention allows a person of reasonable skill the ability to make the use of a tape measure more ergonomic, accurate and efficient when being used as a guide for a radius to mark circumferences or parts thereof.

The invention makes inside measurements quick and easy to obtain with a high degree of accuracy.

The invention aids the user in cleaning water or other material off the surfaces of the tape while it is rewinding into the tape housing.

The invention allows the user to easily control the speed of the tape rewinding into the housing.

The invention has a simple to manufacture multipurpose tape end to enhance the tape measure's overall functional utility.

The invention allows a person of reasonable skill to make the tape measure capable of functioning as a square for making measured lines at a right angle to a straight edge.

In summary, the tape measure according to the resent invention may be characterized in one aspect as including a housing body having a front, and a duck-bill extending from the front of the housing body. The duck-bill has a ledge thereon and a tape passage therethrough. It also has a guide face formed on its front face at an end of the duck-bill distal from the front of the housing body. A tape aperture is formed in the front face of the duck-bill. The tape aperture is aligned with the tape passage. The duck-bill has a length from its front face to its base, where the base of the duck-bill is at substantially the front of the tape housing.

A flexible tape having a width is resiliently coiled in a storage position in a cavity in the housing body. The tape cooperates with, so as to slidably translate through, the tape passage. The tape extends from the cavity and through the tape passage and the tape aperture so as to extend from the housing body and the duck-bill through the tape aperture. The tape is configured in the cavity in the housing body so as to be selectively extendable from and retractable into the storage position in the housing body between fully extended and fully retracted positions of the tape.

A rigid tape end is mounted on a distal end of the tape, distal from the housing body. The tape end has a vertical portion and a tongue portion. The vertical portion extends substantially perpendicularly from the distal end of the tape and has a downward segment oppositely disposed to an upper segment. The downward and upper segments of the vertical portion extend oppositely relative to the distal end of the tape. The upper segment is elongate so as to have a vertical dimension which is greater in length than the width of the tape. The tongue is mounted flush along the distal end of the tape and has a length dimension along the tape which is substantially equal to or less than the length of the duck-bill.

A finger-operable tape brake is mounted to the duck-bill and cooperates with the tape passage. The tape brake is disposed for user access to the tape brake, for actuation of the tape brake, from underneath the duck-bill. The tape brake includes a selectively actuable brake clamp mounted in the base of the duck-bill. The brake clamp is selectively actuable so as to selectively clamp the tape disposed in the tape passage.

The tape aperture and the tape passage are sized to snugly accommodate the tape and the tongue in sliding translation therethrough. In the fully retracted position the vertical portion of the tape end abuts an upper portion of the front face of the duck-bill and the tongue extends along the tape passage without interfering with the operation of the brake clamp, for example, without contacting the brake clamp. The upper segment of the vertical portion extends above the ledge of the duck-bill. The length of the tongue may be less than the length of the upper segment of the vertical portion of the tape end. The lower segment of the vertical portion may have a length which is less than the length of the upper segment.

The front face of the duck-bill also extends downwardly from the tape aperture to form a guide fence which is substantially planar and orthogonal to the tape. The ledge on top of the duck-bill is of sufficient size; i.e. long enough in a direction parallel with the tape passage and wide enough, so that even though the ledge may be sloping, it provides a thumb pad so that the duck-bill may be pinched or grasped between the thumb and forefinger of a user.

The duck-bill may have a length, i.e. parallel to the tape passage, which is substantially in the range of ¾ inch to 1½ inch. The width of the tape may be substantially in the range of ½ inch to 1½ inch. The length of the upper segment of the vertical portion of the tape end may be substantially in the range of ¾ inch to 1¾ inch. The front face of the duck-bill may extend downwardly from the tape aperture substantially in the range of equal to or greater than ⅜ inch, for example 7/16 inch.

The tape brake advantageously includes a lever arm mounted on a base. The lever arm is resiliently biased by the base, or by a resilient or elastic pivot or hinge on the base, into a brake-unlocked position wherein the tape is not at all clamped between the tape brake's pair of friction pads. The lever arm has a finger pad at a distal end thereof, distal from said base, so that finger pressure exerted by a user against the finger pad depresses the lever aim relative to the base and into the duck-bill against a resisting and return biasing of the base acting on the lever arm. The brake clamp cooperates with the lever arm so as to selectively gradually clamp the tape upon the depression of the lever arm.

In the illustrated embodiment not intended to be limiting the duck-bill has a finger pad aperture on an underside of the duck-bill. The finger pad is movably disposed within the aperture. The lever arm and the base are mounted within the duck-bill.

In a preferred embodiment the ledge of the duck-bill is an upper surface of the duck-bill disposed more or less directly above the finger pad.

In embodiments where the tape has a camber, which is a preferred embodiment, friction surfaces of the friction pads conform to the shape of the camber across substantially the entire width of the tape. That is, the brake clamps include an opposed facing pair of friction pads having an opposed facing pair of friction surfaces sandwiching the tape therebetween. The friction surfaces, when clamped onto the tape engage across the width of the tape. When pressure on the finger pad is released the arm and the base resiliently bias dis-engagement of the friction pads from the tape. The tape aperture may be sized to snugly fit over the tape and the tongue so as to follow the camber of the tape.

In a preferred embodiment, the tongue may be substantially equal in the length to the length of the duck-bill, and the brake clamp is located both at the base of the duck-bill and inset into the front of the housing body.

In a preferred embodiment the vertical portion of the tape end includes at least one tape end aperture, which may include a window aperture to assist a user in grasping both the tape end and a marking device such as a pen or pencil, and a fastener receiving aperture for hooking the tape end onto a fastener such as a screw or nail in building material.

In the illustrated embodiment not intended to be limiting, the arm is pivotally mounted at about a pivot axis on the base for pivoting of the arm about the pivot axis. The pivot axis may be for example located behind the duck-bill, and behind the front of the housing body and underneath the cavity in the housing body. The arm extends from the pivot axis to the finger pad.

A lower friction pad of the pair of friction pads may be carried on the arm for upward engagement into frictional engagement with the tape. An upper friction pad of the pair of friction pads may be rigidly mounted above the tape passage.

BRIEF DESCRIPTION OF THE DRAWINGS

FIG. 6 is a front view of the tape measure.

FIG. 7A is a side view of the tape measure of FIG. 5A.

FIG. 11A is a side view of the double spool tape measure of FIG. 10A.

FIG. 12 is a front view of the double spool tape measure.

FIG. 23 is a perspective view of the tape measure being used to draw a radius.

DETAILED DESCRIPTION OF PREFERRED EMBODIMENTS

Figure 1A:
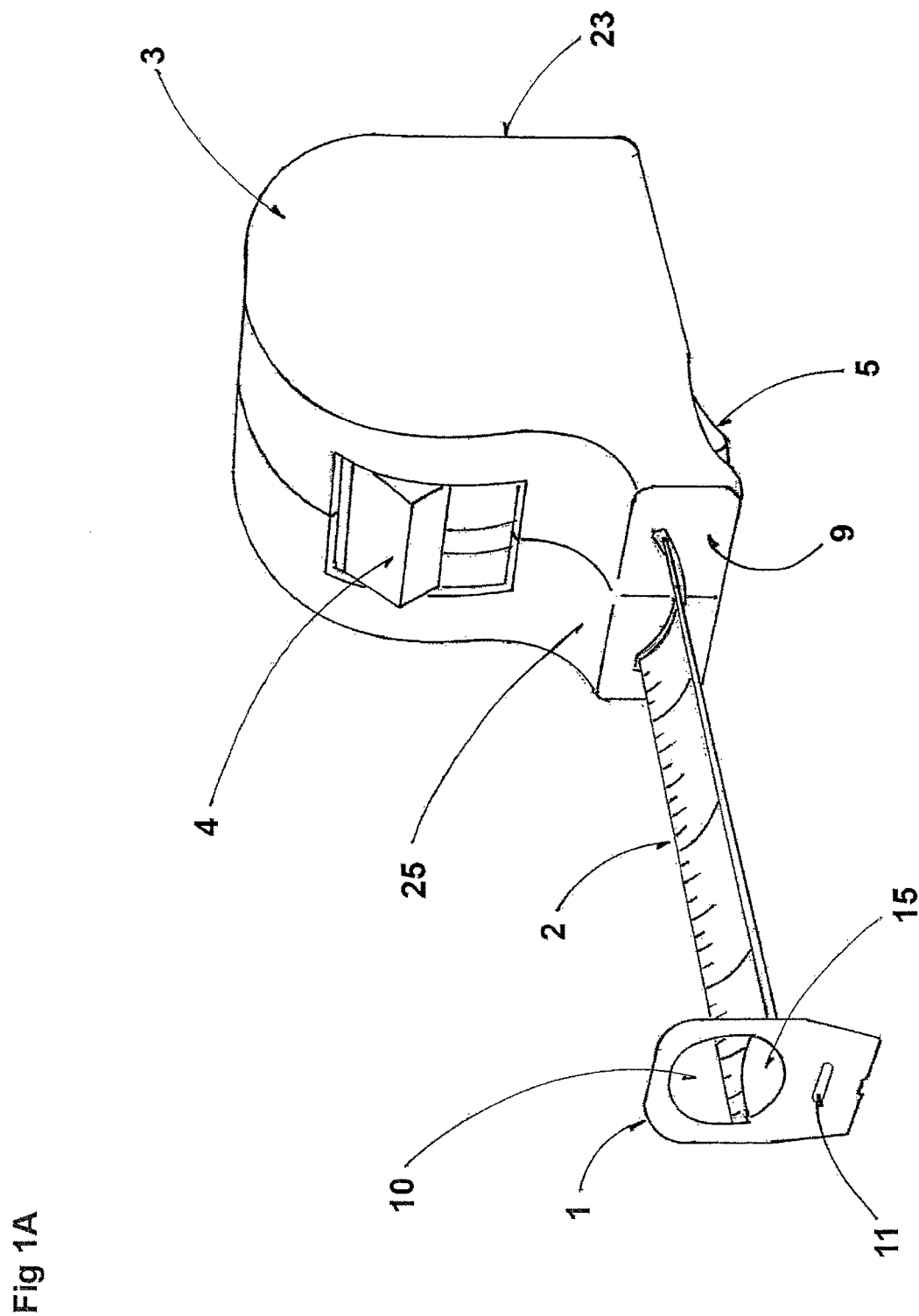
FIG. 1A is a perspective view of the tape measure.

FIG. 1A is a perspective view of the tape measure with the tape housing for a tape and spring on a single spool. The end of the tape 1 is secured to the tape measure 2 by rivets through the tongue 15 and provides a thumb hole 10 for aiding grasping with marking or scoring instruments. The tape 2 is extended out three and one half inches from the guide fence face 9 of the tape housing 3 and would be held firmly in place by pressure to the trigger lock finger pad 5. The face 9 of the tape housing 3 extends significantly below the tape 2 to provide a large flat surface area to act as a guide fence for sliding along the edges of material. The extended face 9 of the tape measure housing 3 provides a thumb ledge 25 that can be used for holding the housing 3 to aid in applying pressure to the surface of the trigger lock 5. The pressure lock 4 common to tape measures is in the upper position and not engaged. The back of the tape housing 23 is parallel to the face of the tape end 1 for easy inside measurements.

Figure 1B:
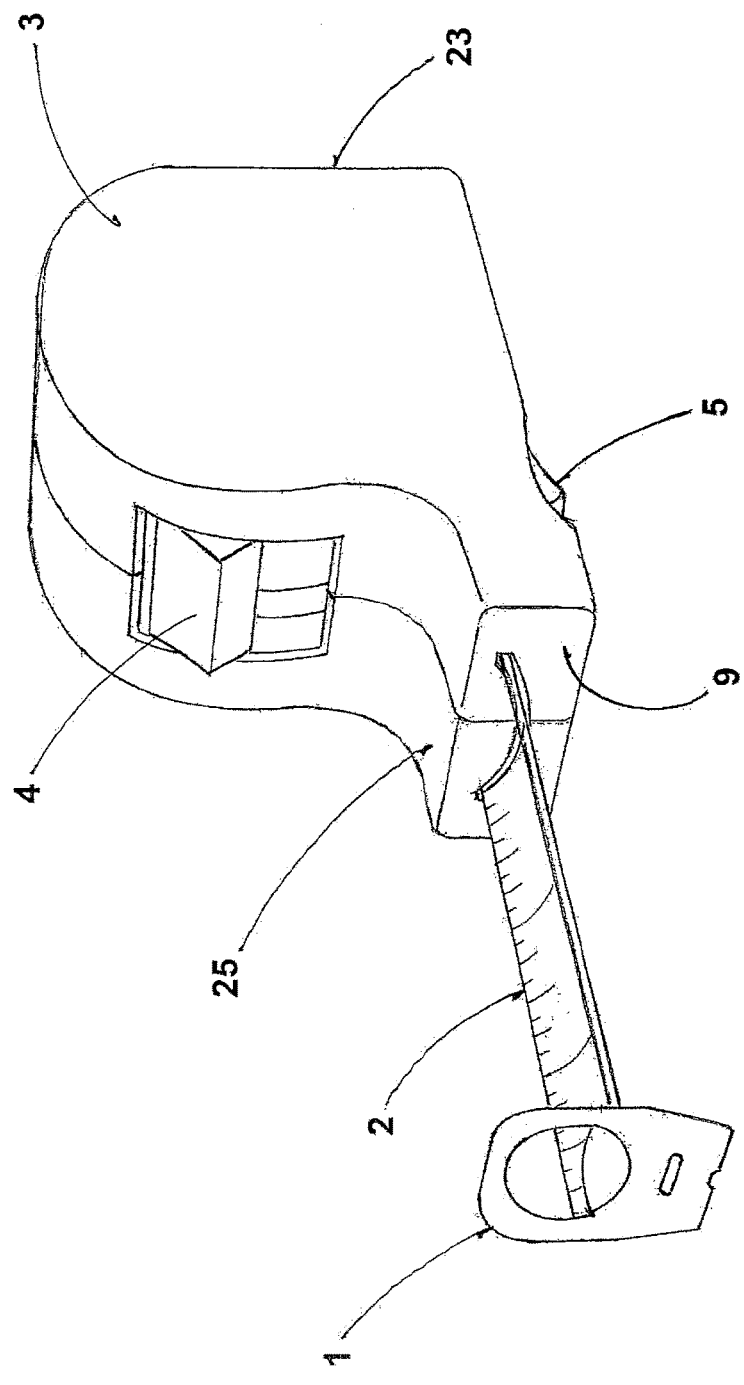
FIG. 1B is a perspective view of the tape measure with an extended face providing a larger finger or thumb hold area.

FIG. 1B is the same perspective view as FIG. 1A but with the protruding large surfaced face 9 of the tape housing 3 extending another ½ inch from the back 23 of the tape housing 3 to provide a larger surface area for the thumb ledge 25 to aid in grasping the tape housing 3 and applying pressure to the trigger lock finger pad 5 while performing any of the various tasks the tape measure is designed to help accomplish.

Figure 2A:
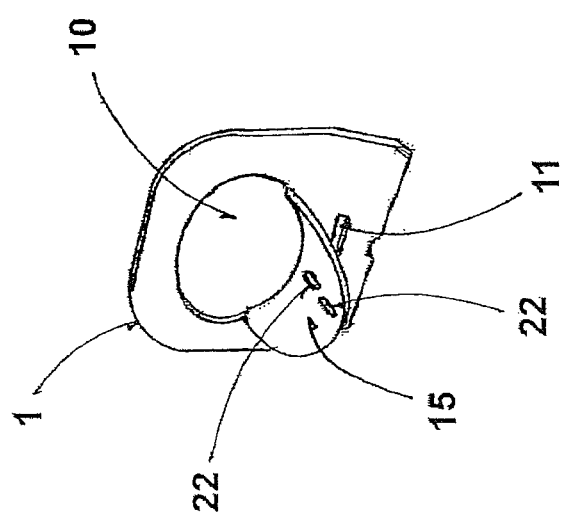
FIG. 2A is a perspective view of the tape end.
Figure 17B:
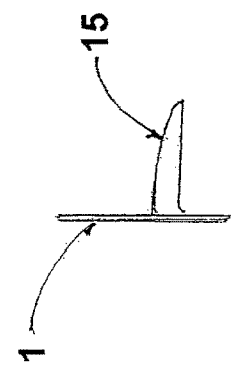
FIG. 17B is a side view of the tape end of FIG. 15B.
Figure 16B:
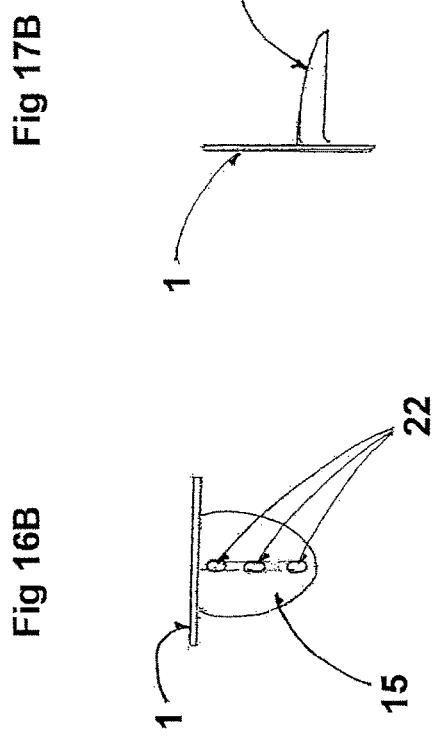
FIG. 16B is a top view of the tape end of FIG. 15B.
Figure 2B:
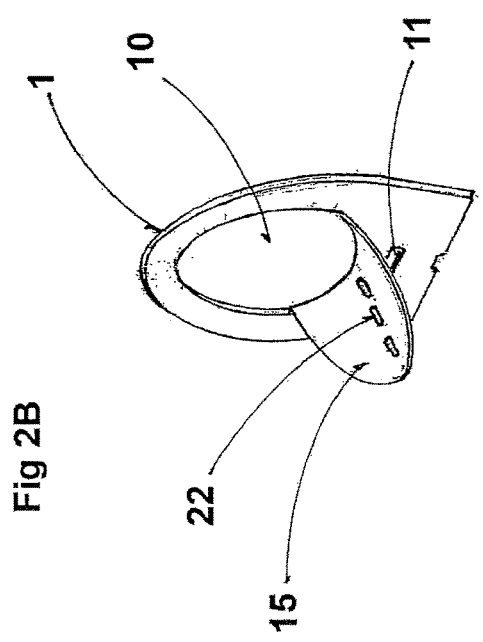
FIG. 2B is a perspective view of a further embodiment of the tape end of FIG. 2A.
Figure 15B:
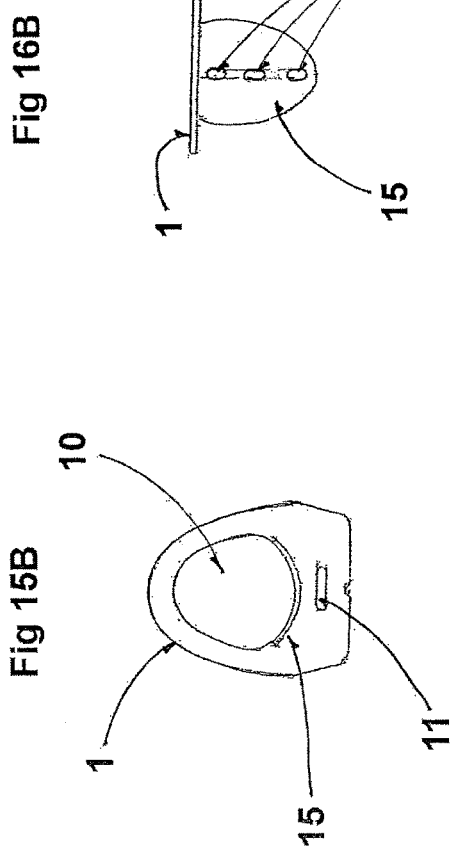
FIG. 15B is a front view of the tape end of FIG. 2B.

FIG. 2A is a perspective view of the tape end 1 with the curved tongue for securing to a curved tape using the elongated rivet holes 22. There is a thumb hole 10 for aiding grasping and a slot 11 for hooking onto nail heads when drawing a radius.

Figure 3:
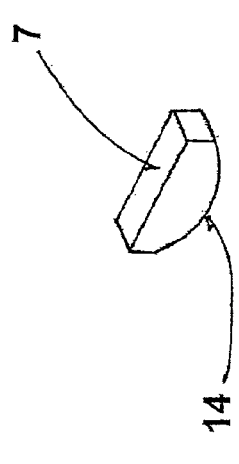
FIG. 3 is a perspective view of the upper friction pad.

FIG. 3 is a perspective view of the upper friction pad 7 with its convex curved high friction surface 14 to provide sufficient surface contact when being used for secure grasping, rewind speed control and cleaning both sides of the tape measure.

Figure 4:
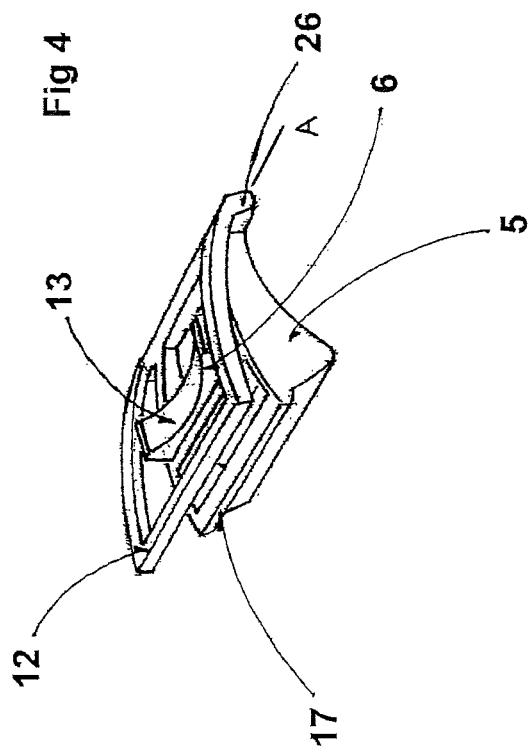
FIG. 4 is a perspective view of the trigger locking mechanism with the lower friction pad.

FIG. 4 is a perspective view of the lower portion of the trigger lock mechanism 5 which provides the housing for the lower friction pad 6 with its concave face 13 for providing a high degree of contact surface to the bottom of a tape measure. The trigger lock arm 12 is designed to fit into a formed cavity in the tape measure housing 3 and provide elastic resistance about pivot axis A through the pivot bar 26 to the trigger lock finger pad 5 keeping the friction pads surface 13 away from the tape 2 when not under pressure. The trigger stopper 17 retains the trigger lock finger pad 5 and prevents it from protruding out of the bottom of its tape measure housing 3.

Figure 5A:
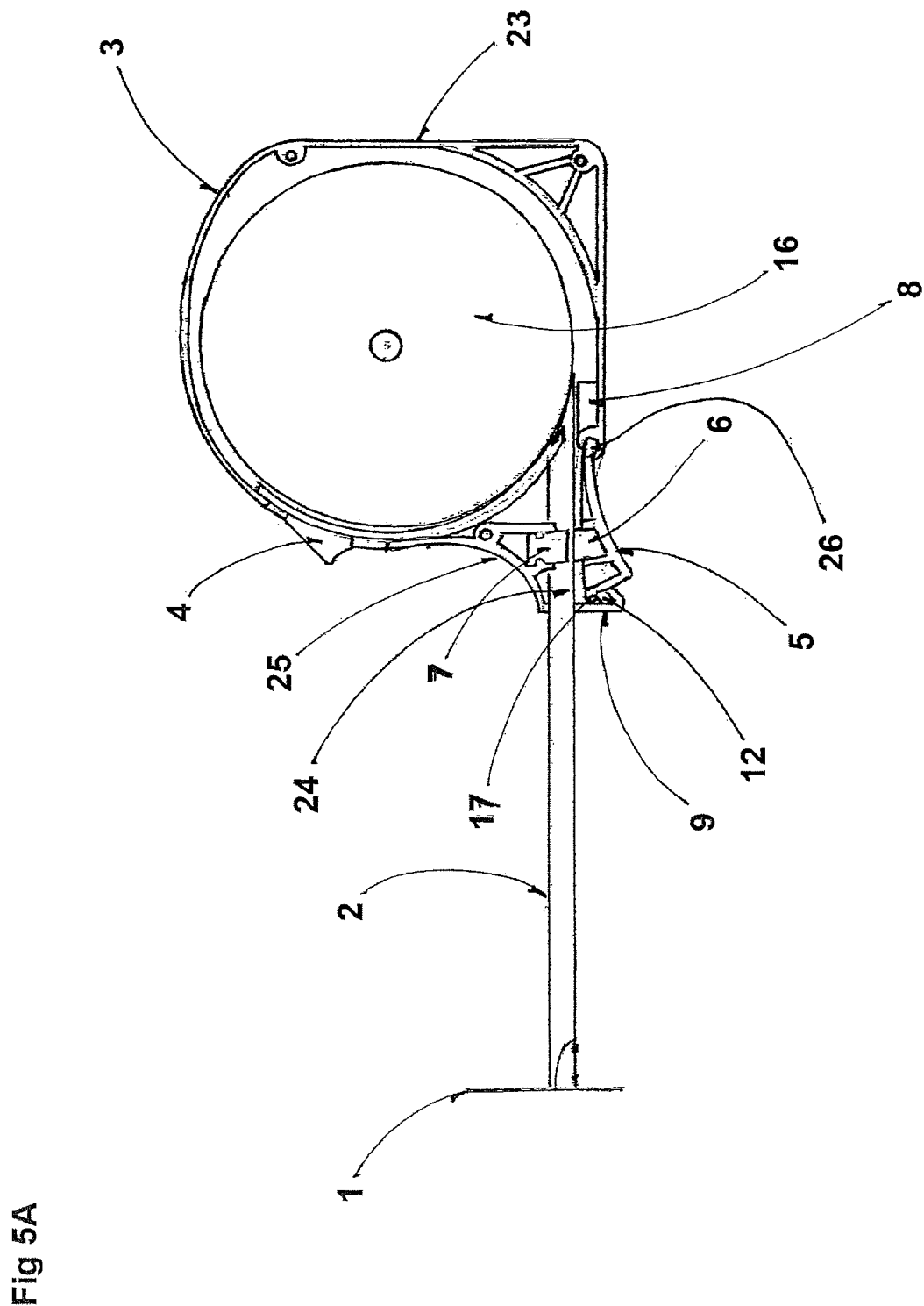
FIG. 5A is a cross section of the tape measure having a short body with the measuring tape partially extended.

FIG. 5A is a cross section of a single tape and spring on a spool 16 tape measure. The tape measure housing 3 retains the combination tape spring spool 16 lower trigger lock mechanism 5, 6, 12, 17 and 26 upper friction pad 7 and pressure lock 4. The tape end 1 is attached to the self-rewinding tape 2 and extends out a measurable distance from the face 9 of the tape measure housing 3. The trigger lock finger pad 5 holds the lower friction pad 6 which aligns with the upper friction pad 7 both conforming to the curved shape of the measuring tape to provide a solid grasp when squeezed together. The trigger lock arm 12 is held in a specifically designed retaining receptacle formed in each half of the tape measure housing 3. In this design the upper trigger lock friction pad 7 is held in a specifically designed holder formed into the tape housing 3 and set back from the fence guide 9 offering a space 24 to ensure the tongue 15 of the tape end 1 does not make contact with the aligned upper and lower friction pads 6 and 7 of the trigger lock mechanism.

Figure 5B:
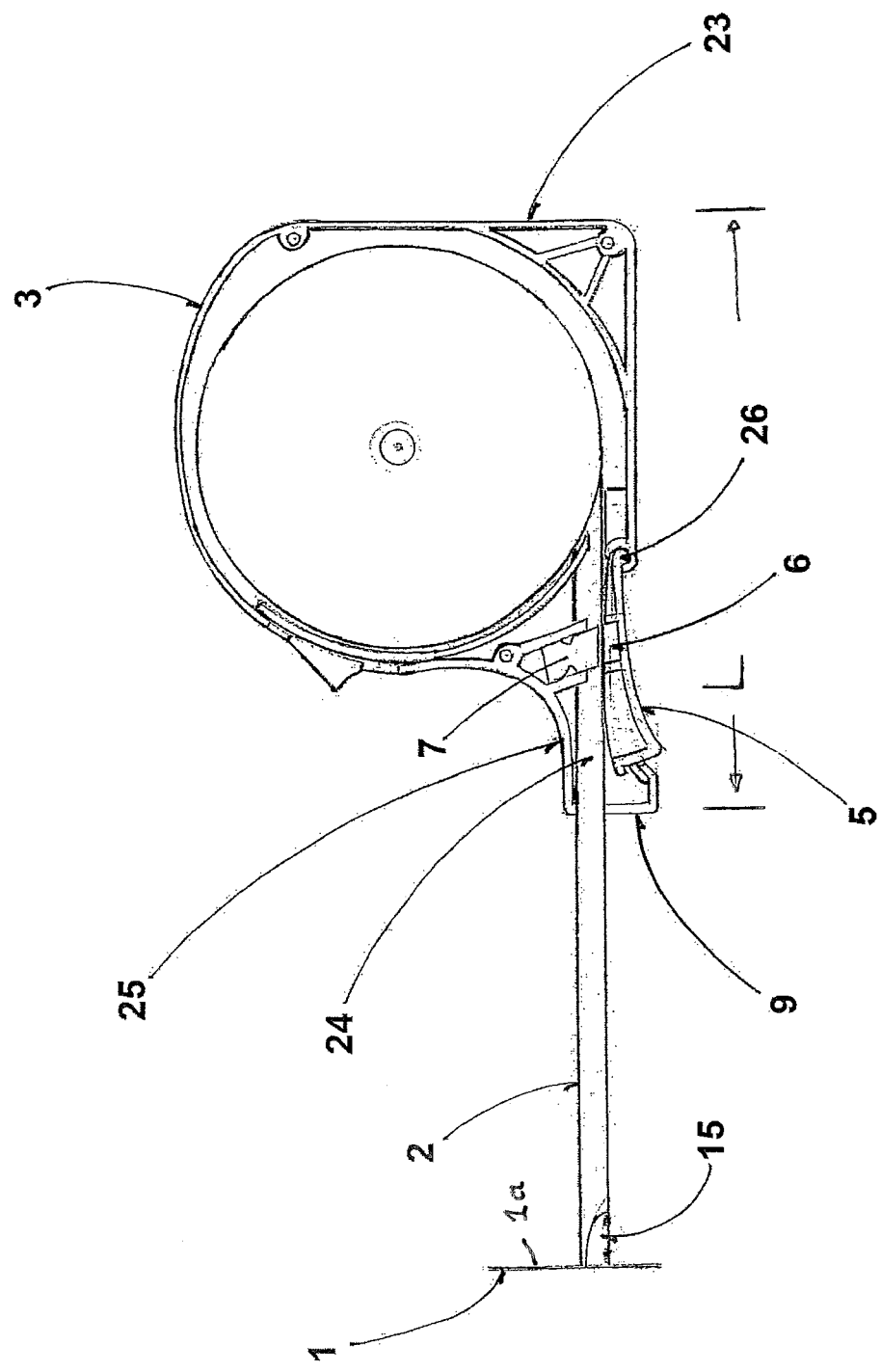
FIG. 5B is a cross section of the tape measure having a longer body providing a greater finger or thumb hold area on the protruding face.

FIG. 5B is similar to FIG. 5A but with the face 9 of the tape housing 3 extending out ½ inch further from tape measure housing 3 towards tape end 1 to provide a larger surface area for both the thumb ledge 25 and trigger lock finger pad 5. While the larger surface area of the thumb ledge 25 eases the ability of the user to grasp this portion of the tape measure housing 3, it also extends the length of the trigger lock finger pad 5 and for arm 12 which can be applied to enhance the mechanical advantage of leverage. This extended design also offers more room in the space 24 for the tongue 15 of the tape end 1. A longer tongue 15 allows a longer upper portion 1a of the tape end 1, by making upper portion 1a more stable. A longer upper portion 1a enhances its ability to hold onto rounded objects, as better described below.

FIG. 6 is a front view of the single spool tape measure housing 3 showing the pressure lock thumb tab 4, tape end 1, thumb hole 10, fence guide face 9, nail head slot 11 and the trigger lock finger pad 5.

FIG. 7A is a side view of the single spool tape housing 3 with the pressure lock 4, tape end 1, tape measure 2, fence guide face 9 and trigger lock finger pad 5. The tape end 1 is perpendicular to tape 2. In this example the tape measure housing 3 may be similar in size to a standard tape measure housing. Thumb ledge 25 may be for example ½ inch in length. Face 9 of the tape measure protrudes from the tape measure housing 3 to provide for the thumb ledge.

Figure 7B:
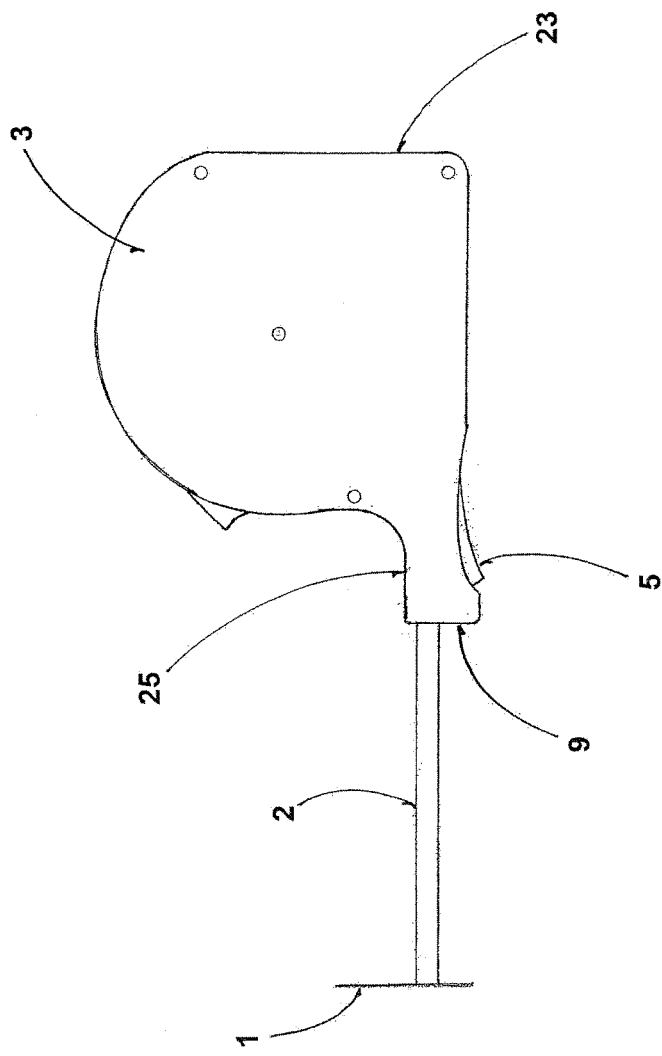
FIG. 7B is a side view of the tape measure of FIG. 5B.

FIG. 7B is similar to 7A but the face 9 of the tape measure housing 3 is extended further out to provide a large thumb ledge 25 for grasping the tape measure housing 3 when squeezing the trigger lock finger pad 5. For example the thumb ledge 25 may be between ½ and 1½ inches long. Grasping the trigger lock finger pad 5 and thumb ledge 25 of the tape measure housing provides the benefit that the user's hand is closer the edge 32 of the building material when scoring or marking parallel lines.

Figure 8:
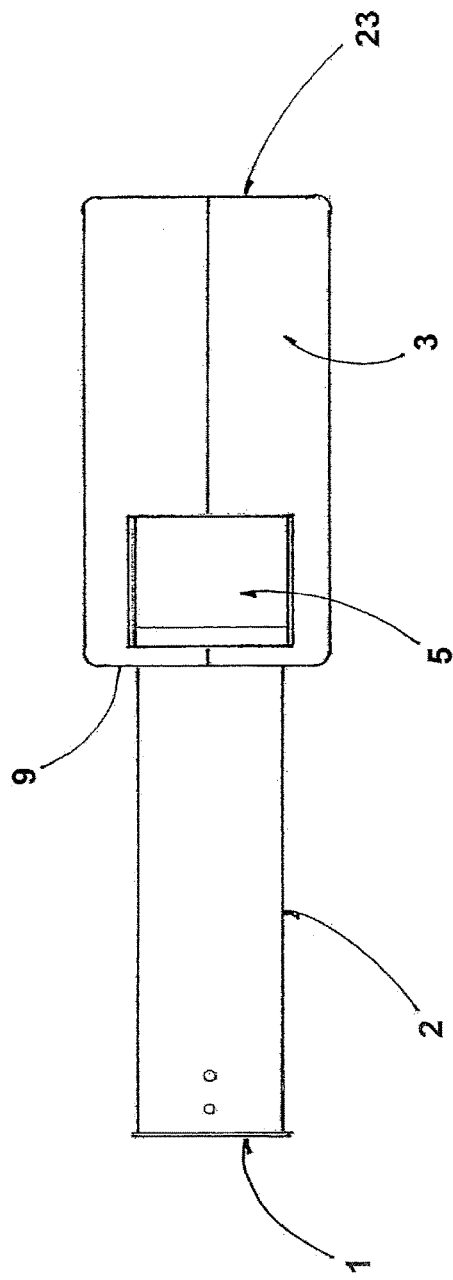
FIG. 8 is a bottom view of the tape measure.

FIG. 8 is a bottom view of the single spool tape measure showing the tape housing 3, fence guide 9, trigger lock finger pad 5, partially extended tape measure 2, and tape end 1.

Figure 9A:
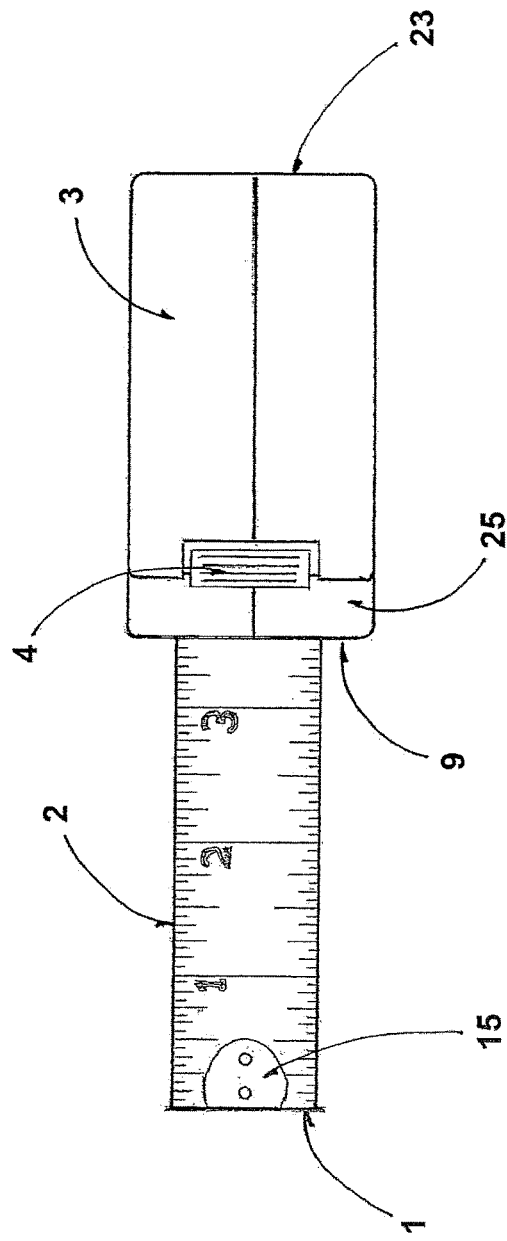
FIG. 9A is a top view of the tape measure of FIG. 7A.

FIG. 9A shows a top view of the single spool tape measure housing 3, pressure lock thumb tab 4, guide fence face 9, extended tape 2, tongue 15 for securing tape end 1 to tape 2 and a smaller thumb ledge 25 on the tape measure housing 3.

Figure 9B:
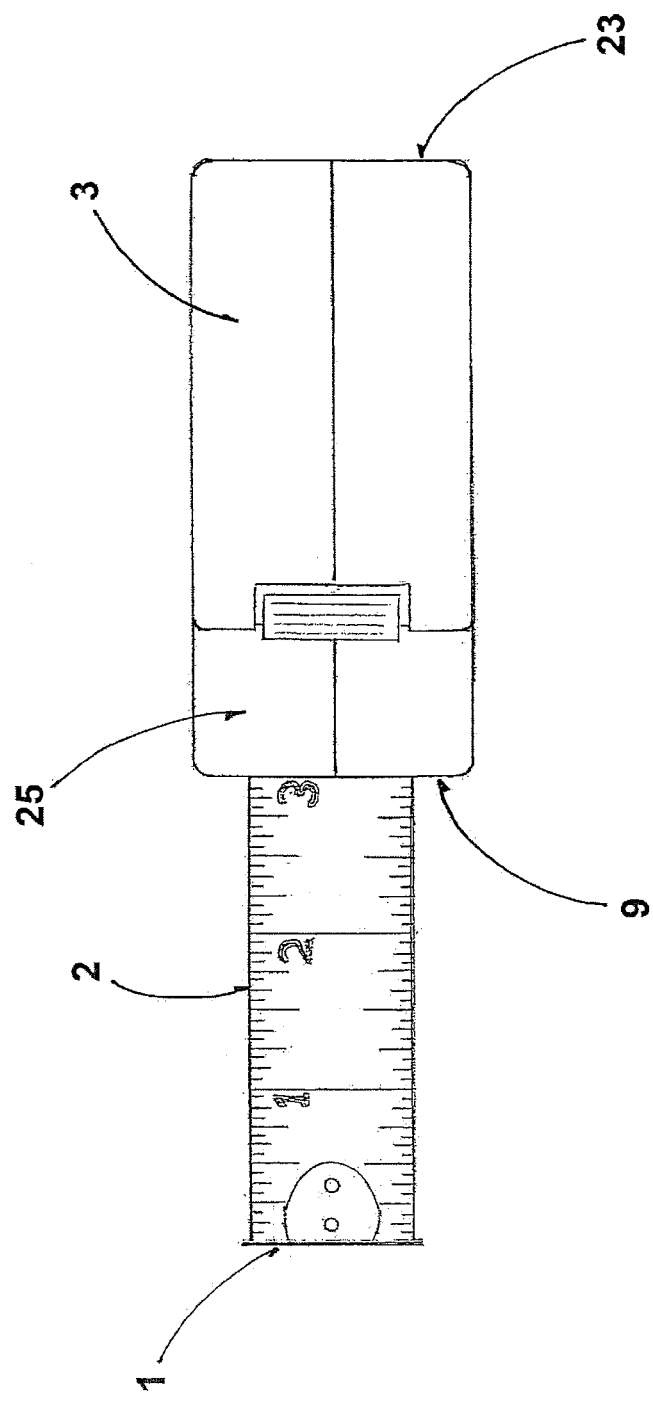
FIG. 9B is a top view of the tape measure of FIG. 7B.

FIG. 9B is similar to 9A with the exception that the face 9 of the tape measure housing 3 extends out further from tape measure housing 3 to provide a larger thumb ledge 25 for grasping the housing 3 and/or applying pressure to the trigger lock finger pad 5.

Figure 10A:
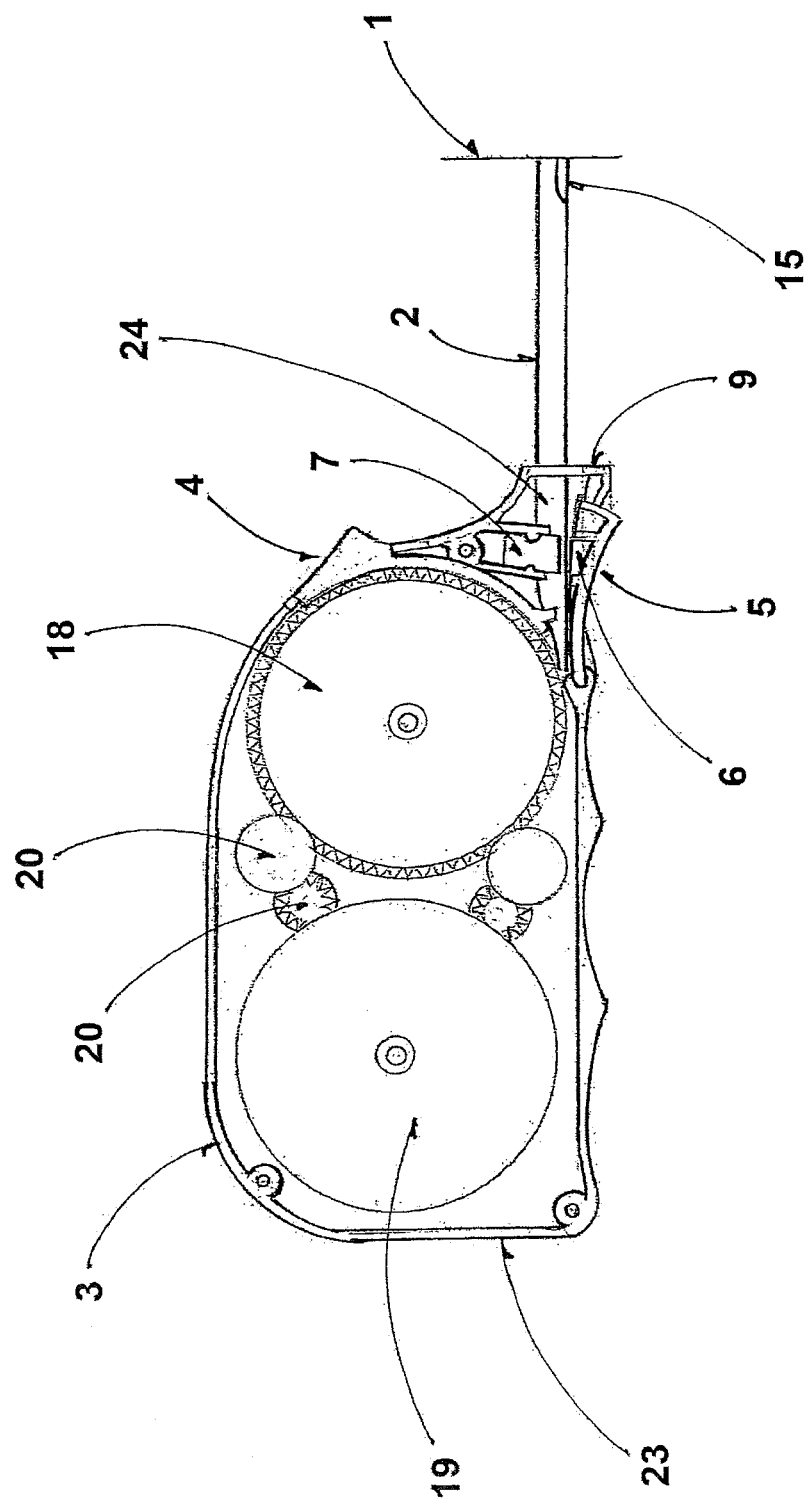
FIG. 10A is a cross section of a double spool tape measure having a shorter body.

FIG. 10A is a cross section of a double spool tape measure with one geared spool 18 containing the measuring tape and the second geared spool 19 containing the rewind spring. This design with cogs allows for a firmer more comfortable grasp than a belt driven design because of its thinner profile. A belt driven design must be on the outside of the tape and spring spools as seen in U.S. Pat. No. 7,024,790 and U.S. Pat. No. 7,458,537. The user's hand is able to close significantly more around the narrower tape measure housing body's 3 profile to better control the pressure and sliding on the face of the guide fence face 9. While grasping the tape end 1 and pulling the tape 2 out from the housing 3 unwinding it from its geared spool 18 the cog or any number of cogs 20 wind up the spring on its geared spool 19 to later rewind the tape 2 back onto its spool 18 when the tape is released. The spools 18, 19 and cog or cogs 20 are geared proportionally for proper ratios of balanced tensions when unwinding or rewinding. Pressure is exerted on the trigger lock finger pad 5 to control the force between the lower trigger lock friction pad 6 and upper trigger lock friction pad 7 to hold the tape 2 firmly at a determined measurement or to control the rate of rewinding the tape 2 into the tape measure housing 3. The space 24 between the fence guide 9 of the tape measure housing 3 and the upper 7 and lower 6 friction pads provides room for the tongue 15 of the tape end 1 to fully retract inside the tape measure housing 3 without interfering with the friction pads 6 and 7 of the trigger locking mechanism. This design with a short protruding guide fence face 9 of the tape housing 3 provides a small thumb ledge 25 for aiding in grasping the trigger lock finger pad 5 or tape measure housing 3.

Figure 10B:
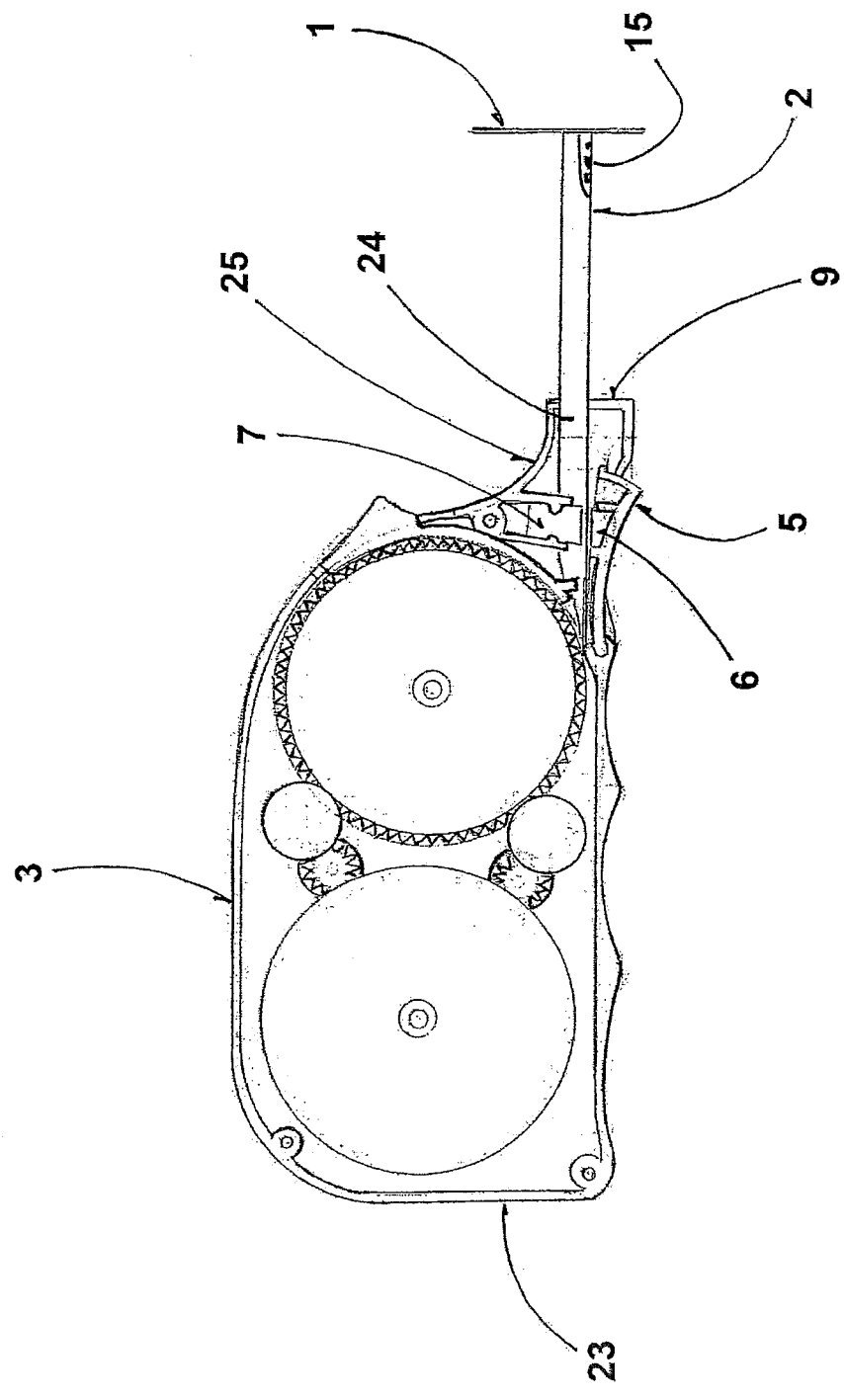
FIG. 10B is a cross section of the double spool tape measure having a longer body.

FIG. 10B is similar to 10A except the guide fence face 9 of the tape measure housing 3 is extended further from the tape measure housing 3 providing a larger thumb ledge 25 and more space 24 between the face 9 of the tape measure housing 3 and the upper and lower 6,7 friction pads. This allows for a longer tongue 15 and thus a longer upper portion 1a of the tape end 1.

FIG. 11A is a side view of the longer narrower two spool tape measure housing 3 with the tape end 1 completely rewound into the tape measure housing 3 held at a zero measurement by the fence guide face 9 preventing the tape end 1 from retracting any further into the tape measure housing 3. The upper portion 1a of the tape end 1 is made accessible and easy to grasp by the access space 21 between the tape measure housing 3 and tape end 1. The tape end 1 is parallel to the back of the tape measure housing 23. There is a small thumb ledge 25 on tape measure housing 3.

Figure 11B:
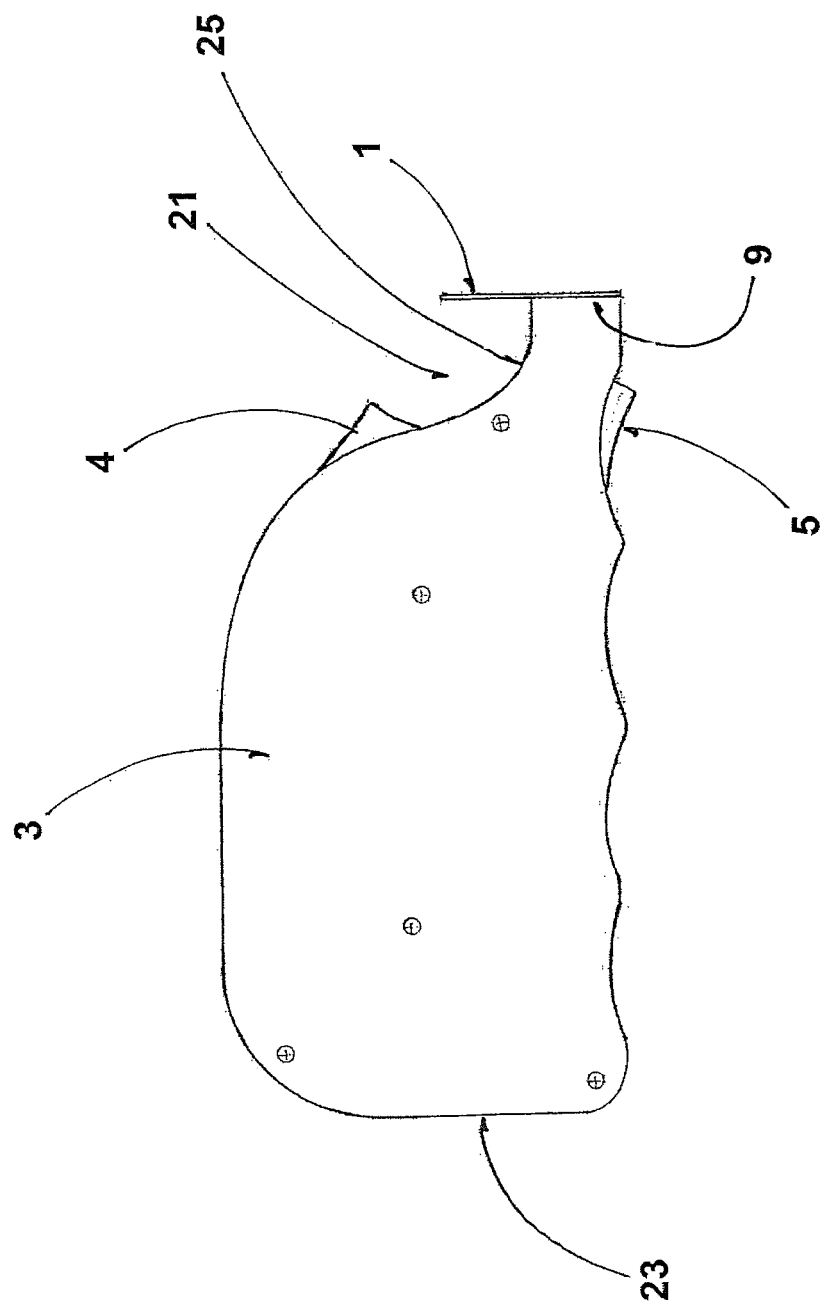
FIG. 11B is a side view of the double spool tape measure of FIG. 10B.

FIG. 11B is similar to 11A except the guide face 9 of the tape measure housing 3 is extended out further from tape measure housing 3 to provide a larger thumb ledge 25 for grasping the tape housing 3 and/or trigger lock finger pad 5.

FIG. 12 is a front view of the narrower profile double spool tape measure housing 3 with the tape end 1 showing the thumb hole 10 and slot 11 for hooking the tape end 1 onto a nail head 27 for drawing a radius 30. The flat wide surface of the fence guide face 9 is equal in width to the tape measure housing 3 helping to keep the tape measure housing's 3 long body axis at a ninety degree right angle to edge 32 of building material when drawing a parallel line. When tape 2 is retracted, the duck-bill shaped thumb ledge 25 is interposed between the tape end 1 and main body of the tape measure housing 3.

Figure 13:
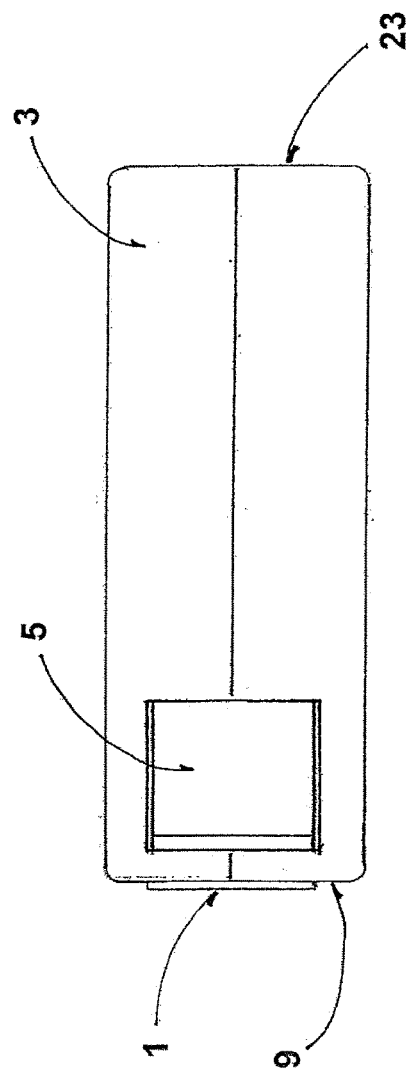
FIG. 13 is a bottom view of the double spool tape measure of FIG. 10A.

FIG. 13 is a bottom view of the double spool elongated tape measure housing body 3 with the tape end 1 flush against the face of the fence guide face 9. The accessible finger pad 5 of the trigger locking mechanism is seen secured within the tape measure housing's body.

Figure 14:
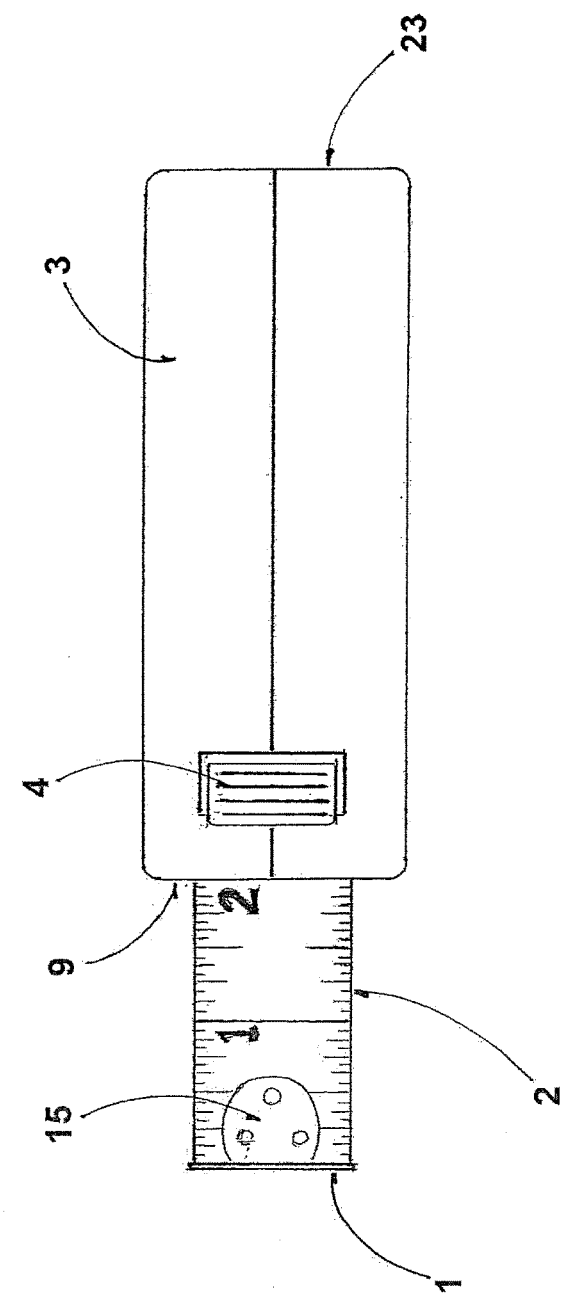
FIG. 14 is a top view of the double spool tape measure of FIG. 13.

FIG. 14 is a top view of the two spool elongated tape housing body 3 showing the accessible pressure lock finger pad 5. The tongue 15 is formed as part of the tape end 1 and is riveted to the end of tape 2. Tape 2 is shown extended two inches out from guide fence face 9 on tape measure housing 3. The vertical portion or face 1a of tape end 1 is supported by tongue 15 at a right angle to tape 2.

Figure 15A:
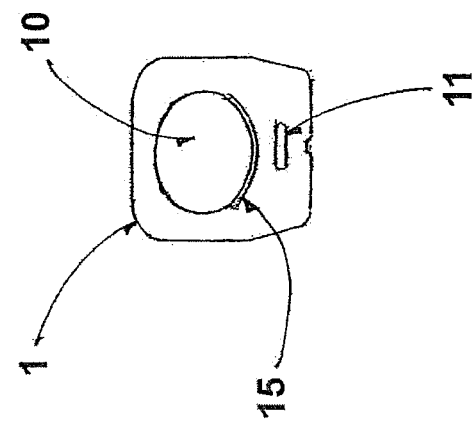
FIG. 15A is a front view of the tape end of FIG. 2A.

FIG. 15A is a view of the back of the tape end 1 showing the curvature of the tongue 15 for conformably attaching tongue 15 to the tape 2 so as to match the camber of tape 2. The thumb hole 10 and slot 11 provide for hooking tape end 1 onto a nail 27.

Figure 16A:
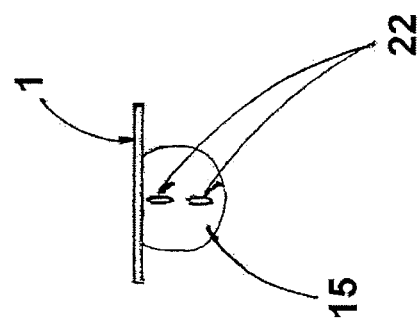
FIG. 16A is a top view of the tape end of FIG. 15A.

FIG. 16A is a top view of the tape end 1 showing tongue 15 and elongated rivet holes 22

Figure 17A:
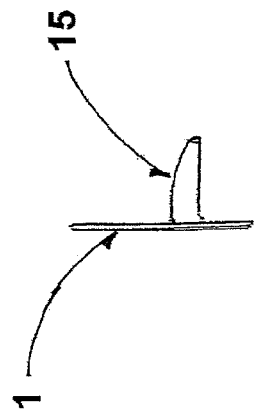
FIG. 17A is a side view of the tape end of FIG. 15A.

FIG. 17A is a side view of the tape end 1.

Figure 18:
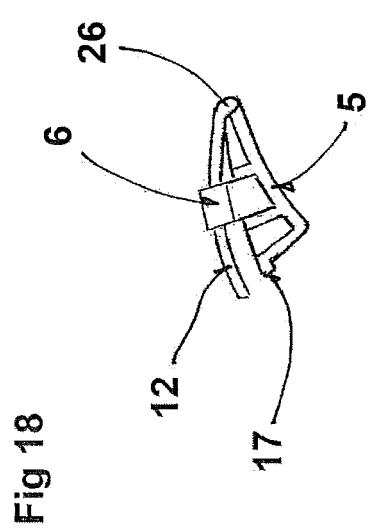
FIG. 18 is a side view of the trigger locking mechanism.

FIG. 18 is a cross section of the dynamic lower portion of the trigger locking mechanism showing the finger pad 5 that holds the lower friction pad 6. The mechanism is held within the tape measure housing to provide a stationary trigger lock arm 12 and movable finger pad 5 that is kept from coming out of the housing with the finger pad stopper 17. The pivot bar 26 unifies the trigger locking mechanism attaching the trigger lock atm 12 to the trigger lock finger pad 5 while offering flexibility and resilient resistance to the pivoting action of finger pad 5 relative to lock arm 12.

Figure 19:
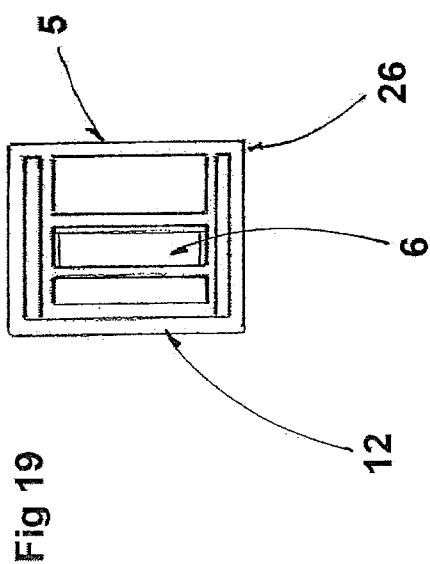
FIG. 19 is a top view of the trigger locking mechanism.

FIG. 19 is a top view of the lower portion of the trigger locking mechanism with the trigger lock arm 12 affixed at the pivoting bar 26 to the movable trigger lock finger pad 5 that contains the affixed lower friction pad 6.

Figure 20:
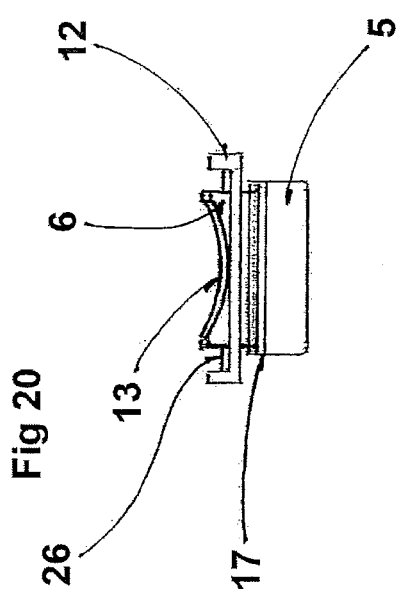
FIG. 20 is a front view of the trigger locking mechanism.

FIG. 20 is a front view of the lower dynamic portion of the trigger locking mechanism showing the trigger lock arm 12, finger pad 5, pivot bar 26 and stopper 17. Seated within the trigger locking finger pad 5 is the lower friction pad 6 with its concave curved surface 13 for maximum surface contact with the measuring tape 2.

Figure 21:
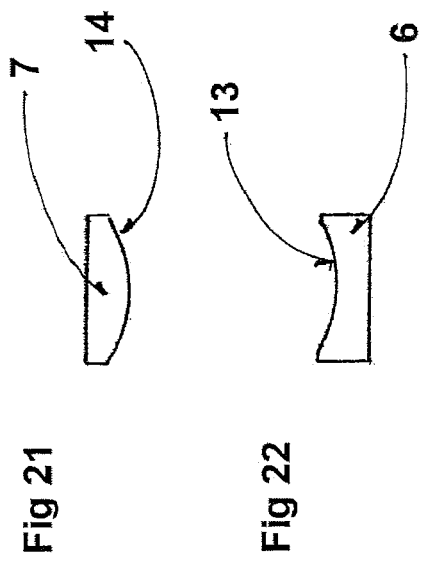
FIG. 21 is a front view of the upper friction pad.

FIG. 21 shows a front view of the upper friction pad 7 with its convex shaped contact surface 14.

Figure 22:
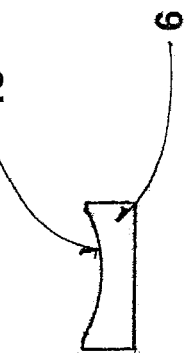
FIG. 22 is a front view of the lower friction pad.

FIG. 22 shows a view of the lower friction pad 6 and its concave shaped contact surface 13.

FIG. 23 shows the tape measure being used to draw a constant radius. The tape end 1 is hooked onto a nail head 27 by using the small slot 11 provided to receive nail heads. The user is grasping the tape measure housing 3 while applying pressure to the trigger lock with the user's thumb (unseen) and tilting the tape measure housing 3 so the user can to put tension on the measuring tape 2. This allows a constant fixed measurement while providing a crotch 2a in the intersection between face 9 and tape 2 (either the upper or lower side of the tape 2) to hold a marking instrument 28 against the face 9 of the tape measure housing 3 and measuring tape 2. The tape measure housing is drawn toward the user so as to twist tape 2 and tip of the marking instrument 29 to the vertical. This allows a constant radius 30 to be drawn.

Figure 24:
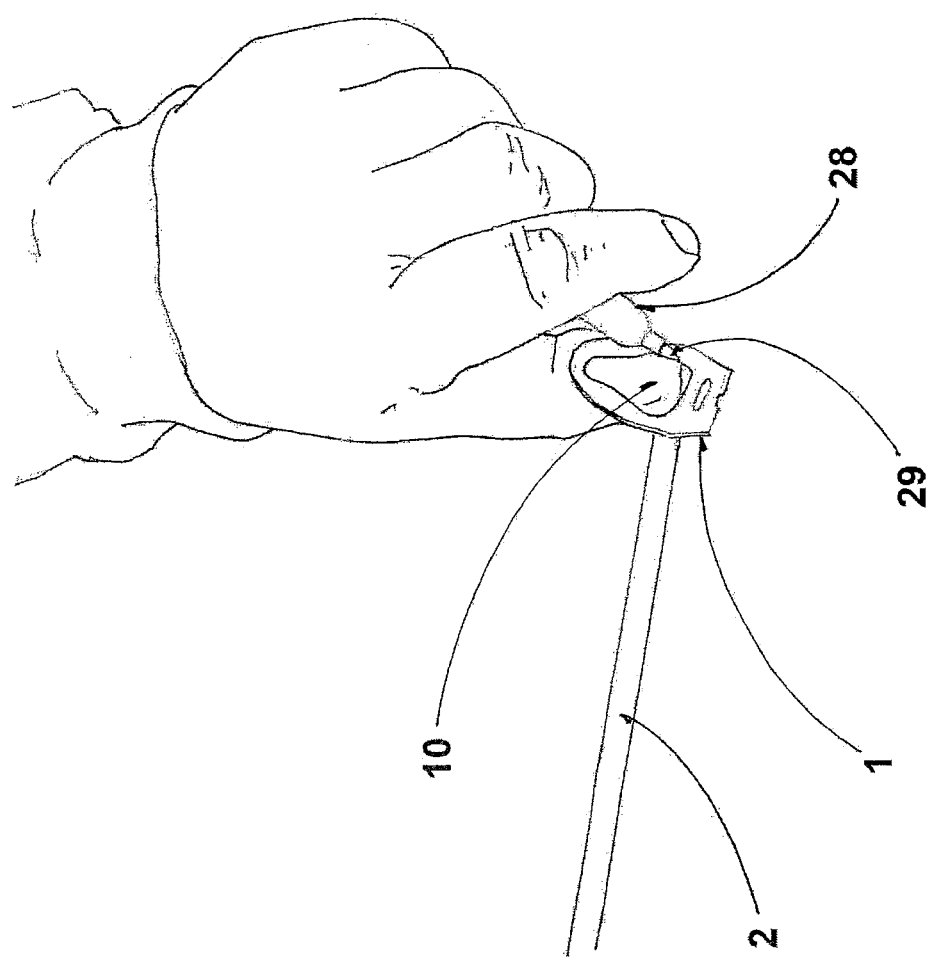
FIG. 24 is a perspective view of a user holding the tape end and a marking device in an open hand.

FIG. 24 shows a user holding the tape end 1 by placing their thumb in the thumb/finger hold 10 to thereby apply tension to the measuring tape 2. The marking instrument 28 is held separately in the user's hand with the tip 29 of the marking instrument 28 in a position to protrude from the tape end 1 once the user's hand is closed.

Figure 25:
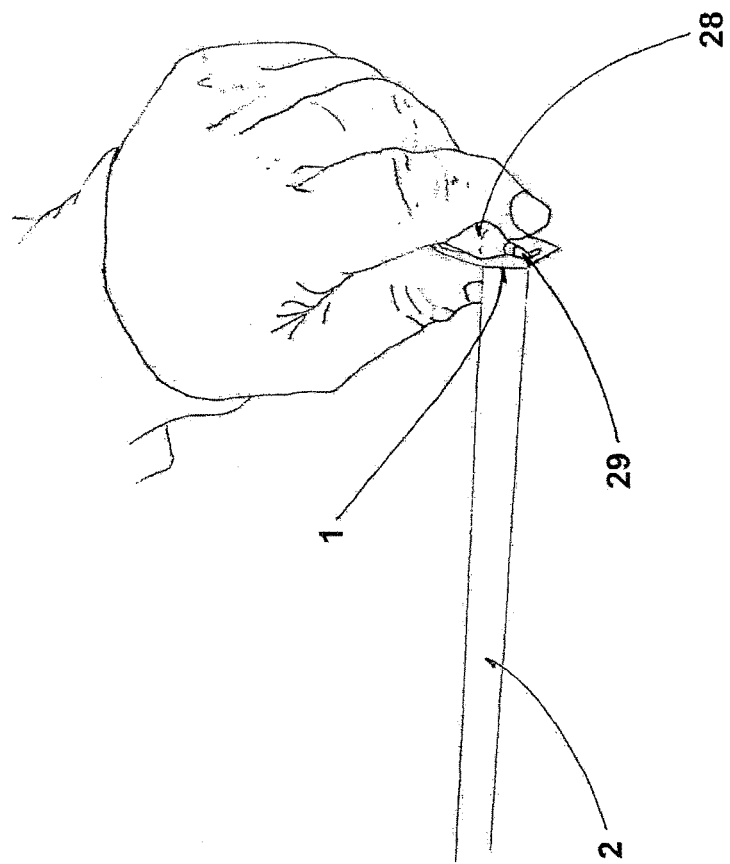
FIG. 25 is a perspective view of a user grasping the tape end and marking device in unison.

FIG. 25 is the view of FIG. 24, but with the user's hand clasped so that the tape end 1, marking instrument 28 and protruding tip 29 of the marking instrument are working in unison for their intended marking purpose.

Figure 26:
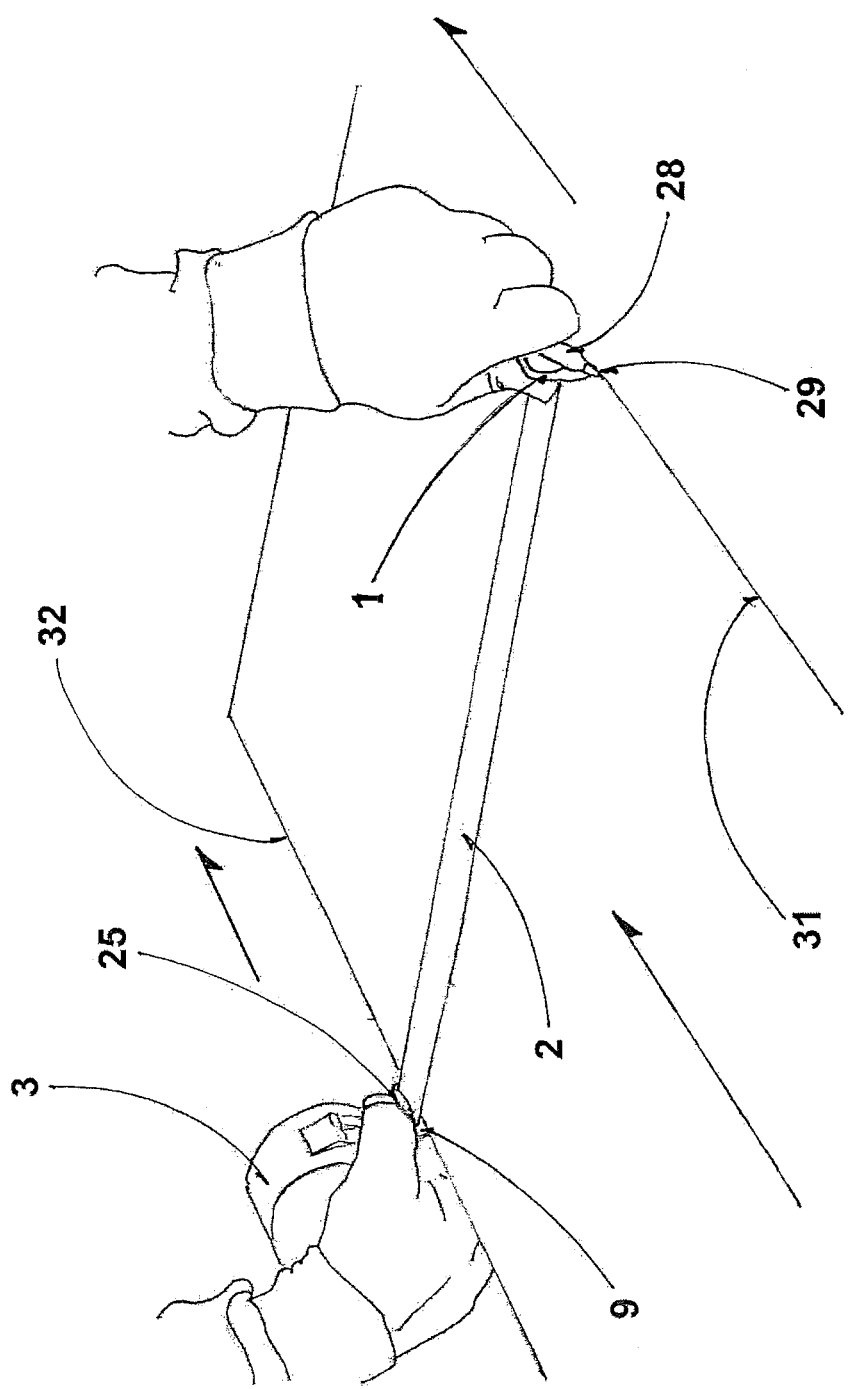
FIG. 26 is a perspective view of a user making a parallel line to an edge of building material with the tape measure and a marking instrument.

FIG. 26 shows the user grasping marking instrument 28 according to FIG. 25 and marking a parallel line. The user is using one hand to hold the tape end 1 and marking instrument 28 in unison so that the tip 29 of the marking instrument is projecting below the tape end 1 allowing marking of a straight line 31 as the user draws the tape housing 3 (in the user's other hand) and tape end 1 towards them. The user is grasping the tape housing 3 with the other hand while holding their thumb on the protruding thumb ledge 25 and simultaneously grasping the trigger pad 5 lock (unseen) while guiding the face 9 of the tape housing along the edge 32 of the building material thereby providing a constant parallel measurement. This task is accomplished while applying constant tension to the measuring tape 2.

Figure 27:
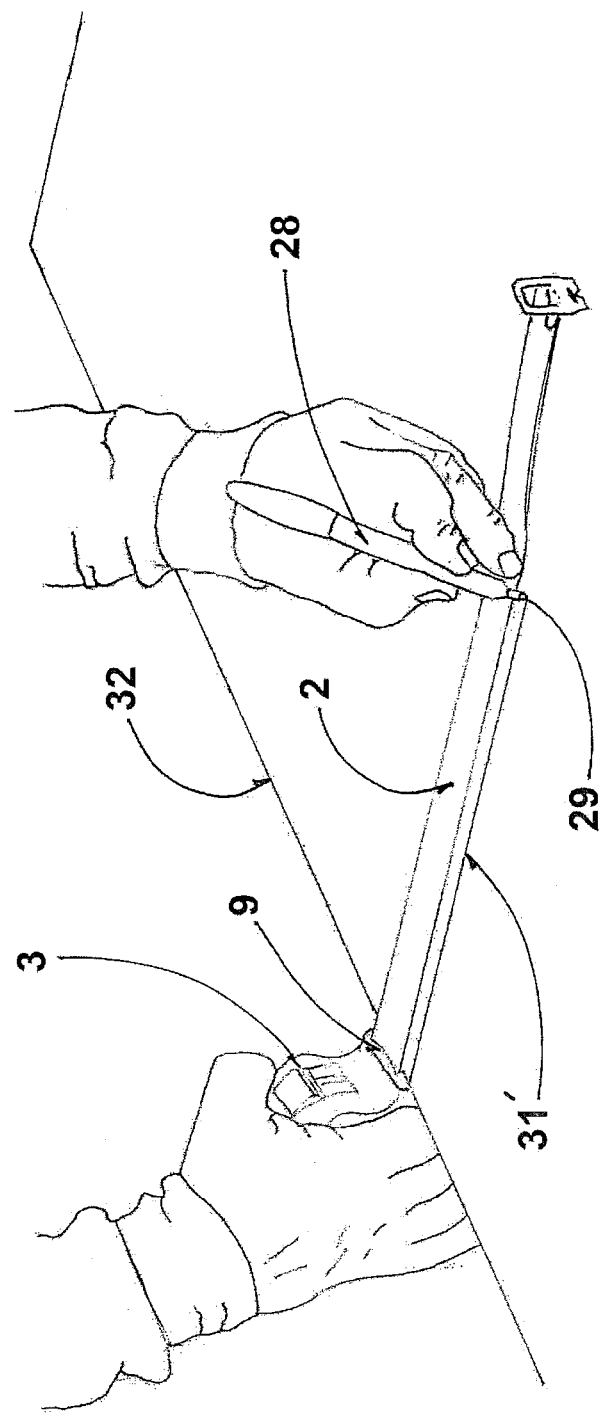
FIG. 27 is a perspective view of a user marking a line perpendicular to a straight edge of a sheet of building material.

FIG. 27 shows the user marking a line 31' at a right angle to the edge 32 of the building material. This task is accomplished by grasping the tape housing 3, applying pressure to the trigger lock finger pad 5 (unseen) while simultaneously applying pressure to the face 9 of tape housing 3 against the edge 32 of the building material. The user is holding a marking instrument 28 so that the tip 29 marks a continuous line 31' as the marking instrument 28 is guided along the edge of the metal measuring tape 2.

FIGS. 2B, 15B, 16B and 17B are similar to FIGS. 2A, 15A, 16A and 17A respectively and demonstrate that versions of the design can be produced for various outcomes and design styles.

Thus it will be understood that, in one aspect not intended to be limiting the invention combines measuring indicator and guide face 9 with a secure locking mechanism and multi-use tape end 1 are all encompassed to offer simplified, functional, cooperative features. By squeezing the finger pad 5 towards tape housing 3, a measurement may be obtained while at the same time the tape housing provides a guide face 9 to slide along an edge 32 of building material for parallel scoring or marking purposes. It also provides a crotch 2a, where tape measure 2 and face 9 meet, in which to hold a marking device 28 when using the tape measure for laying out a circumference, or part thereof, a chosen radius 30 (FIG. 23). The invention also allows the tape measure to be used as a square (FIG. 27) in circumstances where short to medium length reference lines are needed perpendicular to a straight edge 32 of the material.

The one piece tape end 1 has a surface perpendicular to the plane of the tape 2 to form a T shape. Both the lower and upper surfaces may be used to hook onto material. The tape may then be pulled out from housing 3 for making measurements. A larger upstanding upper portion 1a of the tape end 1 can hook onto small diameter pipes, wires and building materials with rounded edges. Upper portion 1a also allows the user to extend the tape 2 outwardly from the housing 3 and hook onto materials overhead such as floor joists when doing layout work from below. The larger thumb hole 10 in the upper part 1a of the tape end 1 helps to secure and stabilize grasping by the user. When using the tape for parallel scoring or marking purposes (FIG. 26) the thumb or index finger of the user may be held against the upper portion 1a of the tape end 1 using the hollow 10 for grasping stability while a pencil or utility knife is held between the tape end 1, and the index finger and thumb of the user. The cutting instrument or pencil would then be held to slightly protrude below the lower portion of the tape end 1 for marking or scoring. Although Garity U.S. Pat. No. 6,070, 338 has a tape end with an upper portion, it is offset from the bottom tab and angled toward the tape housing making it unusable for pulling accurate measurements.

Conventional spring loaded rewinding tape measures typically have a metal tab tape end that extends downwardly at ninety degrees from the end of the tape. The metal tab is used to grasp and pull the measuring tape out from its housing and to hook over edges of building material to stop the tape from rewinding into the tape housing.

In the present invention, because fence guide face 9 extends significantly below the bottom of the tape, for example in the range of ⅜ inch or greater below the tape, a conventional metal tape tab end would have little or no exposed area extending below the housing for the user to easily grasp when the tape is fully retracted into the housing. To overcome this problem when the tape is fully rewound inside the housing the tape end and tape measure housing have a sufficient space 21 between them to allow unimpeded access to the upper portion of the tape end 1 for grasping and pulling the tape out from within its enclosure 3.

The wide planar surface area of the guide fence face 9 with its chamfered or rounded outer edges on the tape measure housing 3 provides an increased element of accuracy in parallel marking and scoring. By squeezing the tape housing 3 and trigger lock finger pad 5 stopper firmly together, while at the same time exerting force to press face 9 against the building material edge 32, the extended tape 2 is stably cantilevered at a ninety degree right angle to edge 32. The slightly rounded ends on the guide fence face 9 of the tape measure housing 3 assist in smooth sliding of face 9 along the straight edges 32 of the building materials while the user maintains a constant firm pressure of face 9 against edge 32.

The protruding ledge 25 provides a useful duck-bill having a top surface area for gripping with a user's thumb or finger. This can be used to aid the user in applying pressure to the finger pad 5 of the trigger lock while having the user's hand close to the guide face 9 of the tape measure housing 3 thereby affording greater control in parallel marking and scoring. It also provides better ergonomic grasping abilities for smaller hands when using the tape measure for parallel marking and scoring. This feature of the invention mimics the hand positioning used by many drywall professionals to hold a tape between their thumb and index finger while using the index finger as a guide while scoring wallboard.

When using the present invention for drawing a radius of a circle or part thereof (FIG. 23) on building material such as sheet material, the user can secure the tape measure end 1 to a nail or screw 27 at the centre point of the radius 30 by hooking it on to the nail head using the small slot 11 on the lower portion of the tape end 1. The user can then extend the tape to the desired measurement, lock it securely by applying pressure to the trigger lock finger pad 5, twist the tape 2 and housing 3 so as to desired angle the housing relative to the sheet material, rest a pencil or other marking device 28 in crotch 2a, that is, against both the bottom of the measuring tape 2 and the fence guide face 9 of the tape measure housing 3 then proceed to scribe or mark the arc of the radius 30 by drawing the tape measure towards the user or pushing it away from the user about the pivot point.

For making inside measurements the large tape end 1 works by being in parallel to the back contact area on the tape measure housing 23. The user to holds the finger pad 5 firmly compressed when the back of the housing 23 and tape end 1 are in contact with both of the oppositely disposed, opposed facing inside surfaces then reads the measurement by referencing the shown measurement on tape 2 at face 9, and then adding the length "L" (as seen in FIG. 5B) of the tape measure housing 3 for the overall cumulative measurement. Whether metric or imperial, the tape measure body's length design can be adjusted and determined to provide an easy base measurement for calculations. For the single spool tape measure housing (FIG. 1A and FIG. 1B) an overall measurement of 3+¼ or 3+½ inches or 90 mm for metric, would help make the addition for inside measurements easier. In the longer double spool version of the same design (FIG. 11) an overall tape housing length of 4 inches removes the need for adding fractions.

In wet working conditions the build-up of water, sawdust and other debris on the surface of tape 2 is often an obstacle that prevents the measuring tape from being able to fully retract inside the body of the tape measure housing 3. Applying light pressure to the finger pad 5 of the trigger locking mechanism cleans both sides of the retracting tape 2. The shape of the opposed facing surfaces of upper 7 and lower 6 friction pads mirror the shape of the camber of tape 2 to provide a high degree of frictional surface contact. The friction pads are set back along ledge 25, that is, within the duck-bill, from the face 9 of the tape measure housing 3 so as not to interfere, when the pads are clamping onto tape 2, with the attaching tongue 15 and rivets of the tape end 1 when tape 2 is fully rewound into the tape housing 3. In comparison to the prior art, Doriguzzi Bozzo Mario EP 0 932 016 A2 has its braking surfaces on the front face of the tape housing at the distal end relative to the pivot point of the pressure mechanism. This requires a void to allow the attaching portion of the tape end and the fastening rivets to be drawn into the tape housing. Such a design feature inhibits the contact surfaces from cleaning water and debris off both sides of the tape.

The shaped friction pads 6 and 7 of the internally housed trigger locking mechanism also retain support and help to maintain the camber of tape 2 when tape 2 is extended, for example while reaching out for long measurements. The camber in the extended tape 2 aids tape 2 in behaving like a beam so that it may be cantilevered to stand out for long distances without collapsing.

The trigger locking mechanism uses the mechanical advantage of leverage to increase sensitivity and help the user control of the amount of force applied to the friction pads that hold the tape securely. The user's finger can apply pressure at various points along the length of the finger pad 5 so as to vary the mechanical advantage in relation to applying pressure to the friction pads 6 and 7. In comparison, in the prior art Doriguzzi Bozzo, Mario EP 0 932 016 A2 has a pressure locking mechanism at the bottom of the tape measure housing with a single pressure point and the braking surfaces at the distal end relative to the hinge point of the free moving member. The prior art braking system is in applicant's opinion, designed with a flexible shock absorbing factor between the push button and the end which is at the face of the housing distal to the pivot point. Applicant surmises that this is to soften the impact forces and protect the end of the tape measure when retracting. This flexible aspect of the design in applicant's view reduces the ability to apply pressure on the braking surfaces when under force making it incompatible for use as a firm holding mechanism needed when making parallel marking or scoring lines. The design also does not possess high friction surfaces in its braking mechanism. A similar breaking system is found in U.S. Pat. No. 5,657,551 to Henry Lin. It is not resiliently housed in the tape measure housing and works when finger pressure is directly applied to the friction surface not providing any mechanical advantage of leverage or a rubber like high friction material needed if the secured tape is to endure the forces generated by the pressure and tension needed for parallel marking and scoring. An engineered polymer material does not in applicant's opinion provide enough friction to securely grasp the low friction surface of a metal measuring tape firmly enough to resist high tension or compression forces in working conditions.

An advantage in the trigger locking mechanism of the present invention is a variable pressure sensitivity that allows a user the ability to easily learn how to control the rate at which the tape rewinds into the housing. Pressure applied to the pressure pad 5 at its distal end from the stationary pivot point exerts greater force on the friction pads 6 and 7 than an equal pressure exerted nearer the pivot point. This is even more pronounced if pressure applied is between the friction pads 6 and 7 and the fixed pivot point held stationary in the tape housing 3 by the pivot bar 26.

Tapes rapidly rewinding into the housing can create a whipping effect that may lead to stress fractures that can result in tears to the metal tape. These tears reduce the tools longevity and the sharp edges can cut the user. Retracting tapes can also sometimes lead to cuts or injury when the whipping effect causes the tape end to strike the operator. Fast rewinding tape measures can also damage the tape ends attachment through the forces exerted on the attaching rivets and metal tape by the constant, repetitive, abrupt stopping.

There are currently tape measure housing designs with open spaces on the bottom that allow the user to control rewinding speed where the user applies pressure to the exposed tape measure with their index finger (U.S. Pat. No. 8,806,770 B1 Steele et al). This design can lead to injuries if the rewinding tape has developed tears in it. A slightly bent crack in a tape measure can have a sharp edge capable of slicing into a user's exposed skin when the tape is rewinding under the control of finger pressure.

The one piece trigger locking mechanism, when made of a material with inherent flexibility and memory qualities such as nylon, offers resistance to prevent the trigger lock finger pad 5 and lower friction pad 6 from moving freely within the tape measure housing 3 by resiliently exerting sufficient force to hold the trigger lock stopper against the bottom of the tape measure housing 3. In the prior art, Doriguzzi Bozzo EP 0 932 016 A2 has a braking mechanism that is free moving and uses gravity to release it when not under pressure. This leaves the moveable element lose to move freely and interfere with the function of the tape measure when not under intentional pressure. By not offering a biasing resistance there is no feel or feedback to the user to the pressure sensitive locking mechanism until engagement.

The tape measure according to the present invention may also be used to replace a square (FIG. 27) in a given situation such as measuring and marking dimensional lumber such as so-called two by fours, two by sixes or two by eights and cutting out window openings in siding. By holding the tape housing 3 firmly and applying pressure to the finger pad 5 of the trigger lock mechanism while also pressing face 9 of the tape measure housing 3 against a straight edge 32 of building material, the tape housing 3 can be rotated to follow the camber of the tape 2 while in contact with the flat surface of the building material to provide a straight edge as the edge of tape 2 is rotated into contact with the surface of the building material. When the edge of tape 2 comes into contact or near contact with the surface of the building material a visible right angle marking or scoring line 31 can be produced by a marking device 28 following the tape's edge. The length of these perpendicular lines can also be easily calculated with the tape measure. For example, if the user needed a square line off a straight edge at 8 and ¾ inches the tape can be held firmly with the trigger lock at 18 and ¾ inches then using the above method a line can be drawn or scribed from 18 and ¾ down to 10 inches to produce the desired measured result.

As an example of how all of the proposed inventions features can all work together in a given situation the following is one possible scenario: When needing to cut out the top of a window opening from a piece of siding the tape can be used to mark both sides of the window opening, then using the tape as a square mark out the perpendicular lines to the required depth and then mark out the parallel line to the same depth using the methods described above. This simple task eliminates the need for a square and a straight edge or chalk line.

What is claimed is:

1. A tape measure comprising:
  a housing body having a front,
  a duck-bill extending from said front of said housing body, said duck-bill having a ledge thereon and a tape passage therethrough, and having a guide face formed on a front face thereof at an end of said duck-bill distal from said front of said housing body, a tape aperture formed in said front face of said duck-bill and aligned with said tape passage, and said duck-bill having a length from said front face to a base of said duck-bill at substantially said front of said tape housing,
  a flexible tape having a width and resiliently coiled in a storage position in a cavity in said housing body cooperating with said tape passage, said tape having measurement demarcations therealong on at least an upper surface thereof, said tape extending from said cavity and through said tape passage and said tape aperture so as to extend from said housing body and said duck-bill through said tape aperture, said tape configured in said cavity in said housing body so as to be selectively extendable from and retractable into said storage position in said housing body between extended and retracted positions of said tape,
  a rigid tape end mounted on a distal end of said tape, distal from said housing body, said tape end having a vertical portion and a tongue portion, said vertical portion extending substantially perpendicularly from said distal end of said tape and having a downward segment oppositely disposed to an upper segment, said downward and upper segments extending oppositely relative to said distal end of said tape, wherein said upper segment is elongate so as to have a vertical dimension which is greater in length than said width of said tape, and wherein said tongue is mounted flush along said distal end of said tape and has a length dimension along said tape which is substantially equal to or less than said length of said duck-bill,
  a finger-operable tape brake mounted to said duck-bill and cooperating with said tape passage and disposed for user access to said tape brake for actuation of said tape brake from underneath said duck-bill, said tape brake including a selectively actuable brake clamp mounted in said base of said duck-bill, said brake clamp selectively actuable so as to selectively clamp said tape disposed in said tape passage,
  said tape aperture and said tape passage sized to accommodate said tape and said tongue in sliding translation therethrough, and wherein, in said fully retracted position said vertical portion of said tape end abuts said front face of said duck-bill and said tongue extends along said tape passage without interfering with said brake clamp, and said upper segment of said vertical portion extends above said ledge of said duck-bill,
  and wherein said front face of said duck-bill extends downwardly from said tape aperture to form a guide fence which substantially planar and orthogonal to said tape.

2. The tape measure of claim 1 wherein said length of said duck-bill is substantially in the range of ¾ inch to 1½ inch.

3. The tape measure of claim 2 wherein said tape width is substantially in the range of ½ inch to 1½ inch and wherein said length of said upper segment of said vertical portion of said tape end is substantially in the range of ¾ inch to 1¾ inch.

4. The tape measure of claim 3 wherein said front face of said duck-bill extends downwardly from said tape aperture substantially in the range of equal to or greater than ⅜ inch.

5. The tape measure of claim 4 wherein said tape brake includes a lever arm mounted on a base, said lever arm resiliently biased by said base into a brake-unlocked position, said lever arm having a finger pad at a distal end thereof, distal from said base, so that finger pressure exerted against said finger pad depresses said lever arm relative to said base and into said duck-bill against a resisting and return biasing of said base acting on said lever arm, said brake clamp cooperating with said lever arm so as to selectively gradually clamp said tape upon said depression of said lever arm.

6. The tape measure of claim 5 wherein said duck-bill has a finger pad aperture on an underside of said duck-bill, and wherein said finger pad is movably disposed within said aperture, and wherein said lever arm and said base are mounted within said duck-bill.

7. The tape measure of claim 6 wherein said ledge of said duck-bill is an upper surface of said duck-bill disposed substantially directly above said finger pad.

8. The tape measure of claim 7 wherein said tape has a camber, and wherein said brake clamps include an opposed facing pair of friction pads having an opposed facing pair of friction surfaces sandwiching said tape therebetween, and wherein said pair of friction surfaces conform to the shape of said camber across substantially the entire said width of said tape.

9. The tape measure of claim 8 wherein said tape aperture is sized to snugly fit over said tape and said tongue so as to follow said camber of said tape.

10. The tape measure of claim 8 wherein said arm and said base resiliently bias dis-engagement of said friction pads from said tape.

11. The tape measure of claim 10 wherein said tongue is substantially equal in said length to said length of said duck-bill, and wherein said brake clamp is at said base of said duck-bill but inset into said front of said housing body.

12. The tape measure of claim 11 wherein said vertical portion of said tape end includes at least one tape end aperture.

13. The tape measure of claim 12 wherein said at least one tape end aperture includes a window aperture and a fastener receiving aperture.

14. The tape measure of claim 10 wherein said arm is pivotally mounted at so as to pivot about a pivot axis on said base, and wherein said pivot axis is located behind said duck-bill and behind said front of said housing body and underneath said cavity in said housing body, and said arm extends from said pivot axis to said finger pad.

15. The tape measure of claim 14 wherein a lower friction pad of said pair of friction pads is carried on said arm for upward engagement into frictional engagement with said tape, and wherein an upper friction pad of said pair of friction pads is rigidly mounted above said tape passage.

16. The tape measure of claim 1 wherein said length of said tongue is less than said length of said upper segment of said vertical portion of said tape end, and wherein said lower segment of said vertical portion has a length which is less than said length of said upper segment.

* * * * *